United States Patent
Birkbeck et al.

(10) Patent No.: US 12,441,954 B2
(45) Date of Patent: Oct. 14, 2025

(54) POWDERY, MUSKY ODORANT MACROCYCLES

(71) Applicant: FIRMENICH SA, Satigny (CH)

(72) Inventors: Anthony Alexander Birkbeck, Satigny (CH); Umberto Maddalena, Satigny (CH)

(73) Assignee: FIRMENICH SA, Satigny (CH)

( * ) Notice: Subject to any disclaimer, the term of this patent is extended or adjusted under 35 U.S.C. 154(b) by 714 days.

(21) Appl. No.: 17/757,728

(22) PCT Filed: Dec. 17, 2020

(86) PCT No.: PCT/EP2020/086703
§ 371 (c)(1),
(2) Date: Jun. 20, 2022

(87) PCT Pub. No.: WO2021/122945
PCT Pub. Date: Jun. 24, 2021

(65) Prior Publication Data
US 2023/0031807 A1    Feb. 2, 2023

(30) Foreign Application Priority Data
Dec. 20, 2019 (EP) .................... 19218958

(51) Int. Cl.
*C11B 9/00* (2006.01)
*C07D 313/00* (2006.01)

(52) U.S. Cl.
CPC .......... *C11B 9/0084* (2013.01); *C07D 313/00* (2013.01)

(58) Field of Classification Search
CPC .............................. C07D 313/00; C11B 9/0084
USPC ............................................. 512/12, 11, 8, 1
See application file for complete search history.

(56) References Cited

U.S. PATENT DOCUMENTS

| 5,266,559 A | 11/1993 | Fankhauser et al. |
| 2009/0306411 A1 | 12/2009 | Meijer et al. |
| 2017/0211014 A1 | 7/2017 | Hölscher et al. |

FOREIGN PATENT DOCUMENTS

| WO | WO-2007054429 A1 * | 5/2007 | ........... C07D 315/00 |
| WO | WO-2018104856 A1 * | 6/2018 | .............. A61P 37/02 |

OTHER PUBLICATIONS

McGinty et al., Fragrance material review on E- and Z-oxacyclohexadec-12(=13)-en-2-one, Jul. 12, 2011, Food and Chemical Toxicology, 49, S152-S157 (Year: 2011).*
Masayoshi Ando et al, "A Mild and Stereospecific Conversion of Vicinal Diols Into Olefins via 2-Methoxy-1, 3-Dioxolane Derivatives", Jan. 1, 1986 (Jan. 1, 1986), pp. 879-882.
International Search Report and Written Opinion for corresponding PCT/EP2020/086703 mailed Apr. 7, 2021; 10 pages.

* cited by examiner

*Primary Examiner* — Jessica Whiteley
(74) *Attorney, Agent, or Firm* — Armstrong Teasdale LLP

(57) ABSTRACT

Described herein is a composition of matter including
a) 0.5 to 85% w/w of (Z)-oxacyclohexadec-12-en-2-one;
b) 0.5 to 30% w/w of (E)-oxacyclohexadec-12-en-2-one;
c) 0 to 30% w/w of (E)-oxacyclohexadec-13-en-2-one; and
d) 0.5 to 85% w/w of (Z)-oxacyclohexadec-13-en-2-one,
the percentage being relative to the total weight of the composition of matter;
wherein the weight ratio of the E-diastereoisomers to the Z-diastereoisomers is in the range between 40:60 and 15:85.

16 Claims, No Drawings

POWDERY, MUSKY ODORANT MACROCYCLES

CROSS-REFERENCE TO RELATED APPLICATIONS

This application is a U.S. National Phase Application of PCT/EP2020/086703, filed Dec. 17, 2020, which claims the benefit of priority to European Patent Application No. 19218958.7, filed Dec. 20, 2019, the entire contents of which are hereby incorporated by reference herein.

TECHNICAL FIELD

The present invention relates to the field of perfumery. More particularly, it concerns a composition of matter comprising
  a) 0.5 to 85% w/w of (Z)-oxacyclohexadec-12-en-2-one;
  b) 0.5 to 30% w/w of (E)-oxacyclohexadec-12-en-2-one;
  c) 0 to 30% w/w of (E)-oxacyclohexadec-13-en-2-one; and
  d) 0.5 to 85% w/w of (Z)-oxacyclohexadec-13-en-2-one.
  the percentage being relative to the total weight of the composition of matter; and
  wherein the weight ratio of the E-diastereoisomers to the Z-diastereoisomers is comprised in the range between 40:60 and 15:85.

Said composition of matter is a useful perfumery ingredient, and therefore the present invention comprises the invention composition of matter as part of a perfuming composition or of a perfuming consumer product. The process to obtain the invention's composition of matter is also part of the present invention.

BACKGROUND OF THE INVENTION

Ingredients imparting musk notes are very appreciated and widely used in perfumery as they are considered as one of a key perfumery base notes in particular macrocyclic musk compounds. Several of said macrocyclic musk compounds possess a double bond leading in general to a mixture of diastereoisomers and/or regioisomers. One example is Habanolide® (Firmenich SA, Geneva, Switzerland) comprising mainly (Z)-oxacyclohexadec-12-en-2-one, (E)-oxacyclohexadec-12-en-2-one, (E)-oxacyclohexadec-13-en-2-one and (Z)-oxacyclohexadec-13-en-2-one with a E:Z ratio comprised between 70:30 and 80:20. The isomeric distribution has an impact on the organoleptic properties of the ingredient. So there is a need to develop access to novel qualities in order to enrich the perfumer's palette. In particular, there is a need to reinforce the nitro-musk aspect of Habanolide® while maintaining the ambrette facet. However, the exact organoleptic properties of each individual isomer are unknown and the actual synthesis leading to pure isomers or to a mixture comprises of mainly E isomers.

For example, in WO2018104856, a method is reported to obtain (E)-oxacyclohexadec-12-en-2-one or (E)-oxacyclohexadec-13-en-2-one in high purity. And, US2017211014 discloses the isomerization of Globalide® leading to a mixture of oxacyclohexadec-12-en-2-one and oxacyclohexadec-13-en-2-one with a E:Z ratio of 65:31.

The present invention provides a novel composition of matter comprising a high amount of Z isomers leading to a strong powdery/musk note very appreciated in perfumery. The prior art does not anticipate that the present composition of matter provided such increase in performance and does not provide any method to enrich the Z isomers.

DESCRIPTION OF THE INVENTION

A surprising synergic effect has been discovered between various isomers of oxacyclohexadec-(12 or 13)-en-2-one leading to the invention composition of matter possessing a powerful musky/powdery note combined with an ambrette aspect.

So, a first object of the present invention is a composition of matter comprising:
  a) 0.5 to 85% w/w of (Z)-oxacyclohexadec-12-en-2-one;
  b) 0.5 to 30% w/w of (E)-oxacyclohexadec-12-en-2-one;
  c) 0 to 30% w/w of (E)-oxacyclohexadec-13-en-2-one; and
  d) 0.5 to 85% w/w of (Z)-oxacyclohexadec-13-en-2-one.
  the percentage being relative to the total weight of the composition of matter; and
  wherein the weight ratio of the E-diastereoisomers to the Z-diastereoisomers is comprised in the range between 40:60 and 15:85.

Said composition of matter can be used as perfuming ingredient, for instance to impart odor notes of the powdery, musk type and also having an amber aspect.

By the terms "E-diastereoisomers" and "Z-diastereoisomers", it is meant the normal meaning understood by a person skilled in the art, i.e the E-diastereoisomers correspond to (E)-oxacyclohexadec-12-en-2-one and (E)-oxacyclohexadec-13-en-2-one and Z-diastereoisomers correspond to (Z)-oxacyclohexadec-12-en-2-one and (Z)-oxacyclohexadec-13-en-2-one.

According to an embodiment of the invention, in the present composition of matter the various constituents mentioned above are present in the following amounts:
  a) 7 to 85% w/w of (Z)-oxacyclohexadec-12-en-2-one;
  b) 0.5 to 25% w/w of (E)-oxacyclohexadec-12-en-2-one;
  c) 0 to 30% w/w of (E)-oxacyclohexadec-13-en-2-one; and
  d) 0.5 to 85% w/w of (Z)-oxacyclohexadec-13-en-2-one.
  the percentage being relative to the total weight of the composition of matter; and
  wherein the weight ratio of the E-diastereoisomers to the Z-diastereoisomers is comprised in the range between 40:60 and 15:85.

According to an embodiment of the invention, in the present composition of matter the various constituents mentioned above are present in the following amounts:
  a) 0.5 to 5% w/w of (Z)-oxacyclohexadec-12-en-2-one;
  b) 0.5 to 1% w/w of (E)-oxacyclohexadec-12-en-2-one;
  c) 0 to 26% w/w of (E)-oxacyclohexadec-13-en-2-one; and
  d) 65 to 85% w/w of (Z)-oxacyclohexadec-13-en-2-one.

According to an embodiment of the invention, in the present composition of matter the various constituents mentioned above are present in the following amounts:
  a) 7 to 85% w/w of (Z)-oxacyclohexadec-12-en-2-one;
  b) 0.5 to 25% w/w of (E)-oxacyclohexadec-12-en-2-one;
  c) 0 to 30% w/w of (E)-oxacyclohexadec-13-en-2-one; and
  d) 0.5 to 60% w/w of (Z)-oxacyclohexadec-13-en-2-one.

According to an embodiment of the invention, in the present composition of matter the various constituents mentioned above are present in the following amounts:
  a) 40 to 85% w/w of (Z)-oxacyclohexadec-12-en-2-one;
  b) 2 to 25% w/w of (E)-oxacyclohexadec-12-en-2-one;

c) 0 to 20% w/w of (E)-oxacyclohexadec-13-en-2-one; and
d) 0.5 to 35% w/w of (Z)-oxacyclohexadec-13-en-2-one.

According to an embodiment of the invention, in the present composition of matter the various constituents mentioned above are present in the following amounts:
a) 40 to 85% w/w of (Z)-oxacyclohexadec-12-en-2-one;
b) 2 to 25% w/w of (E)-oxacyclohexadec-12-en-2-one;
c) 0 to 30% w/w of (E)-oxacyclohexadec-13-en-2-one; and
d) 0.5 to 25% w/w of (Z)-oxacyclohexadec-13-en-2-one.

According to an embodiment of the invention, in the present composition of matter the various constituents mentioned above are present in the following amounts:
a) 50 to 85% w/w of (Z)-oxacyclohexadec-12-en-2-one;
b) 5 to 20% w/w of (E)-oxacyclohexadec-12-en-2-one;
c) 0 to 20% w/w of (E)-oxacyclohexadec-13-en-2-one; and
d) 0.5 to 25% w/w of (Z)-oxacyclohexadec-13-en-2-one.

According to an embodiment of the invention, in the present composition of matter the various constituents mentioned above are present in the following amounts:
a) 55 to 80% w/w of (Z)-oxacyclohexadec-12-en-2-one;
b) 5 to 20% w/w of (E)-oxacyclohexadec-12-en-2-one;
c) 0.5 to 15% w/w of (E)-oxacyclohexadec-13-en-2-one; and
d) 0.5 to 25% w/w of (Z)-oxacyclohexadec-13-en-2-one.

According to any one of the above embodiments of the invention, the present composition of matter may comprise from about 57 to 78% w/w of (Z)-oxacyclohexadec-12-en-2-one, and more particularly from about 60 to 74% w/w of (Z)-oxacyclohexadec-12-en-2-one.

According to a particular embodiment of the invention, the present composition of matter may comprise from about 0.5 to 15% w/w of (Z)-oxacyclohexadec-12-en-2-one.

According to any one of the above embodiments of the invention, the present composition of matter may comprise from about 10 to 20% w/w of (E)-oxacyclohexadec-12-en-2-one, and more particularly from about 15 to 20% w/w of (E)-oxacyclohexadec-12-en-2-one.

According to any one of the above embodiments of the invention, the present composition of matter may comprise from about 1 to 85% w/w of (Z)-oxacyclohexadec-13-en-2-one, and more particularly from about 70 to 85% w/w or from about 1 to 15% w/w of (Z)-oxacyclohexadec-13-en-2-one.

According to any one of the above embodiments of the invention, the present composition of matter may comprise from about 0.5 to 10% w/w of (E)-oxacyclohexadec-13-en-2-one, and more particularly from about 0.5 to 8% w/w of (E)-oxacyclohexadec-13-en-2-one.

According to any one of the above embodiments of the invention, the weight ratio of the E-diastereoisomers to the Z-diastereoisomers is comprised in the range between 35:65 and 15:85, more particularly in the range between 30:70 and 17:83; and more particularly in the range between 25:75 and 18:82.

According to any one of the above embodiments of the invention, the weight ratio of the 12-regioisomers to the 13-regioisomers is comprised in the range between 55:45 and 99:1 or in the range between 20:80 and 1:99; more particularly in the range between 70:30 and 99:1 or in the range between 20:80 and 30:70; more particularly in the range between 75:25 and 97:3; and more particularly in the range between 80:20 and 90:10.

By the terms "12-regioisomers" and "13-regioisomers", it is meant the normal meaning understood by a person skilled in the art, i.e the 12-regioisomers correspond to (E)-oxacyclohexadec-12-en-2-one and (Z)-oxacyclohexadec-12-en-2-one and 13-regioisomers correspond to (E)-oxacyclohexadec-13-en-2-one and (Z)-oxacyclohexadec-13-en-2-one.

As mentioned above, the composition of matter of the invention possesses a very powerful musk and tenacious odor with a stronger than expected powdery note in the direction of nitro musks. The overall odour profile is highly appreciated by perfumers since it opens up new directions in the perfumer's creativity when compared with the prior art ingredient Habanolide®.

Indeed, when the odor of the invention's composition of matter is compared with that of the prior art Habanolide®, then the invention's compositions of matter distinguish themselves by a clearly different odor profile characterized by a stronger powdery, creamy, and ambrette note and by much weaker metallic note, so characteristic of the prior art compound. Moreover, the invention's compositions of matter impart a clearly stronger and more substantive note while bringing more volume to perfuming composition. The invention's compositions of matter distinguish themselves also by showing a nicer olfactive profile. Overall, while the Habanolide® is more in the macrocyclic musk direction with a slight metallic aspect, the present composition of matter is more on the nitro musk direction which is particularly sought due to the highly restricted use of nitro musks.

Said differences lend the invention's the invention's compositions of matter and the prior art compounds to be each suitable for different uses, i.e. to impart different organoleptic impressions.

As mentioned above, the invention concerns the use of the invention's compositions of matter as a perfuming ingredient. In other words, it concerns a method or a process to confer, enhance, improve or modify the odor properties of a perfuming composition or of a perfumed article or of a surface, which method comprises adding to said composition or article an effective amount the invention's composition of matter, e.g. to impart its typical note. Understood that the final hedonic effect may depend on the precise dosage and on the organoleptic properties of the invention's composition of matter, but anyway the addition of the invention's compositions of matter will impart to the final product its typical touch in the form of a note, touch or aspect depending on the dosage. In addition, the invention's composition of matter may also be used to enhance the organoleptic properties of perfuming ingredient or to decrease the unpleasant olfactory impression such as metallic, dusty or chemical facet of some perfuming ingredients.

By "use of the invention's compositions of matter it has to be understood here also the use of any composition containing the invention's compositions of matter and which can be advantageously employed in the perfumery industry.

Said compositions, which in fact can be advantageously employed as perfuming ingredients, are also an object of the present invention.

Therefore, another object of the present invention is a perfuming composition comprising:
i) as a perfuming ingredient, at least one invention's composition of matter as defined above;
ii) at least one ingredient selected from the group consisting of a perfumery carrier and a perfumery base; and
iii) optionally at least one perfumery adjuvant.

By "perfumery carrier" it is meant here a material which is practically neutral from a perfumery point of view, i.e. that does not significantly alter the organoleptic properties of perfuming ingredients. Said carrier may be a liquid or a solid.

As liquid carrier one may cite, as non-limiting examples, an emulsifying system, i.e. a solvent and a surfactant system, or a solvent commonly used in perfumery. A detailed description of the nature and type of solvents commonly used in perfumery cannot be exhaustive. However, one can cite as non-limiting examples, solvents such as butylene or propylene glycol, glycerol, dipropyleneglycol and its monoether, 1,2,3-propanetriyl triacetate, dimethyl glutarate, dimethyl adipate 1,3-diacetyloxypropan-2-yl acetate, diethyl phthalate, isopropyl myristate, benzyl benzoate, benzyl alcohol, 2-(2-ethoxyethoxy)-1-ethano, tri-ethyl citrate or mixtures thereof, which are the most commonly used. For the compositions which comprise both a perfumery carrier and a perfumery base, other suitable perfumery carriers than those previously specified, can be also ethanol, water/ethanol mixtures, limonene or other terpenes, isoparaffins such as those known under the trademark Isopar® (origin: Exxon Chemical) or glycol ethers and glycol ether esters such as those known under the trademark Dowanol® (origin: Dow Chemical Company), or hydrogenated castors oils such as those known under the trademark Cremophor® RH 40 (origin: BASF).

Solid carrier is meant to designate a material to which the perfuming composition or some element of the perfuming composition can be chemically or physically bound. In general such solid carriers are employed either to stabilize the composition, or to control the rate of evaporation of the compositions or of some ingredients. Solid carriers areof current use in the art and a person skilled in the art knows how to reach the desired effect. However by way of non-limiting examples of solid carriers, one may cite absorbing gums or polymers or inorganic materials, such as porous polymers, cyclodextrins, wood based materials, organic or inorganic gels, clays, gypsum talc or zeolites.

As other non-limiting examples of solid carriers, one may cite encapsulating materials. Examples of such materials may comprise wall-forming and plasticizing materials, such as mono, di- or trisaccharides, natural or modified starches, hydrocolloids, cellulose derivatives, polyvinyl acetates, polyvinylalcohols, proteins or pectins, or yet the materials cited in reference texts such as H. Scherz, Hydrokolloide: Stabilisatoren, Dickungs- und Geliermittel in Lebensmitteln, Band 2 der Schriftenreihe Lebensmittelchemie, Lebensmittelqualität, Behr's Verlag GmbH & Co., Hamburg, 1996. The encapsulation is a well-known process to a person skilled in the art, and may be performed, for instance, by using techniques such as spray-drying, agglomeration or yet extrusion; or consists of a coating encapsulation, including coacervation and complex coacervation techniques.

As non-limiting examples of solid carriers, one may cite in particular the core-shell capsules with resins of aminoplast, polyamide, polyester, polyurea or polyurethane type or a mixture thereof (all of said resins are well known to a person skilled in the art) using techniques like phase separation process induced by polymerization, interfacial polymerization, coacervation or altogether (all of said techniques have been described in the prior art), optionally in the presence of a polymeric stabilizer or of a cationic copolymer.

Resins may be produced by the polycondensation of an aldehyde (e.g. formaldehyde, 2,2-dimethoxyethanal, glyoxal, glyoxylic acid or glycolaldehyde and mixtures thereof) with an amine such as urea, benzoguanamine, glycoluryl, melamine, methylol melamine, methylated methylol melamine, guanazole and the like, as well as mixtures thereof. Alternatively one may use preformed resins alkylolated polyamines such as those commercially available under the trademark Urac® (origin: Cytec Technology Corp.), Cymel® (origin: Cytec Technology Corp.), Urecoll® or Luracoll® (origin: BASF).

Other resins are the ones produced by the polycondensation of an a polyol, like glycerol, and a polyisocyanate, like a trimer of hexamethylene diisocyanate, a trimer of isophorone diisocyanate or xylylene diisocyanate or a Biuret of hexamethylene diisocyanate or a trimer of xylylene diisocyanate with trimethylolpropane (known with the tradename of Takenate®, origin: Mitsui Chemicals), among which a trimer of xylylene diisocyanate with trimethylolpropane and a Biuret of hexamethylene diisocyanate are preferred.

Some of the seminal literature related to the encapsulation of perfumes by polycondensation of amino resins, namely melamine based resins with aldehydes includes articles such as those published by K. Dietrich et al. Acta Polymerica, 1989, vol. 40, pages 243, 325 and 683, as well as 1990, vol. 41, page 91. Such articles already describe the various parameters affecting the preparation of such core-shell microcapsules following prior art methods that are also further detailed and exemplified in the patent literature. U.S. Pat. No. 4,396,670, to the Wiggins Teape Group Limited is a pertinent early example of the latter. Since then, many other authors have enriched the literature in this field and it would be impossible to cover all published developments here, but the general knowledge in encapsulation technology is very significant. More recent publications of pertinence, which disclose suitable uses of such microcapsules, are represented for example by the article of K. Bruyninckx and M. Dusselier, ACS Sustainable Chemistry & Engineering, 2019, vol. 7, pages 8041-8054.

By "perfumery base" what is meant here is a composition comprising at least one perfuming co-ingredient.

By "perfuming co-ingredient" it is meant here a compound, which is used in a perfuming preparation or a composition to impart a hedonic effect. In other words such a co-ingredient, to be considered as being a perfuming one, must be recognized by a person skilled in the art as being able to impart or modify in a positive or pleasant way the odor of a composition, and not just as having an odor.

The nature and type of the perfuming co-ingredients present in the base do not warrant a more detailed description here, which in any case would not be exhaustive, the skilled person being able to select them on the basis of his general knowledge and according to the intended use or application and the desired organoleptic effect. In general terms, these perfuming co-ingredients belong to chemical classes as varied as alcohols, lactones, aldehydes, ketones, esters, ethers, acetates, nitriles, terpenoids, nitrogenous or sulphurous heterocyclic compounds and essential oils, and said perfuming co-ingredients can be of natural or synthetic origin.

In particular, one may cite perfuming co-ingredients which are commonly used in perfume formulations, such as:
  Aldehydic ingredients: decanal, dodecanal, 2-methyl-undecanal, 10-undecenal, octanal, nonanal and/or nonenal;
  Aromatic-herbal ingredients: eucalyptus oil, camphor, eucalyptol, 5-methyltricyclo[6.2.1.0~2,7~]undecan-4-one, 1-methoxy-3-hexanethiol, 2-ethyl-4,4-dimethyl-1, 3-oxathiane, 2,2,7/8,9/10-Tetramethylspiro[5.5]undec-8-en-1-one, menthol and/or alpha-pinene;
  Balsamic ingredients: coumarin, ethylvanillin and/or vanillin;

Citrus ingredients: dihydromyrcenol, citral, orange oil, linalyl acetate, citronellyl nitrile, orange terpenes, limonene, 1-p-menthen-8-yl acetate and/or 1,4(8)-p-menthadiene;

Floral ingredients: methyl dihydrojasmonate, linalool, citronellol, phenylethanol, 3-(4-tert-butylphenyl)-2-methylpropanal, hexylcinnamic aldehyde, benzyl acetate, benzyl salicylate, tetrahydro-2-isobutyl-4-methyl-4(2H)-pyranol, beta ionone, methyl 2-(methylamino) benzoate, (E)-3-methyl-4-(2,6,6-trimethyl-2-cyclohexen-1-yl)-3-buten-2-one, (1E)-1-(2,6,6-trimethyl-2-cyclohexen-1-yl)-1-penten-3-one, 1-(2,6,6-trimethyl-1,3-cyclohexadien-1-yl)-2-buten-1-one, (2E)-1-(2,6,6-trimethyl-2-cyclohexen-1-yl)-2-buten-1-one, (2E)-1-[2,6,6-trimethyl-3-cyclohexen-1-yl]-2-buten-1-one, (2E)-1-(2,6,6-trimethyl-1-cyclohexen-1-yl)-2-buten-1-one, 2,5-dimethyl-2-indanmethanol, 2,6,6-trimethyl-3-cyclohexene-1-carboxylate, 3-(4,4-dimethyl-1-cyclohexen-1-yl)propanal, hexyl salicylate, 3,7-dimethyl-1,6-nonadien-3-ol, 3-(4-isopropylphenyl)-2-methylpropanal, verdyl acetate, geraniol, p-menth-1-en-8-ol, 4-(1,1-dimethylethyl)-1-cyclohexyle acetate, 1,1-dimethyl-2-phenylethyl acetate, 4-cyclohexyl-2-methyl-2-butanol, amyl salicylate, high cis methyl dihydrojasmonate, 3-methyl-5-phenyl-1-pentanol, verdyl proprionate, geranyl acetate, tetrahydro linalool, cis-7-p-menthanol, propyl (S)-2-(1,1-dimethylpropoxy)propanoate, 2-methoxynaphthalene, 2,2,2-trichloro-1-phenylethyl acetate, 4/3-(4-hydroxy-4-methylpentyl)-3-cyclohexene-1-carbaldehyde, amylcinnamic aldehyde, 8-decen-5-olide, 4-phenyl-2-butanone, isononyle acetate, 4-(1,1-dimethylethyl)-1-cyclohexyl acetate, verdyl isobutyrate and/or mixture of methylionones isomers;

Fruity ingredients: gamma-undecalactone, 2,2,5-trimethyl-5-pentylcyclopentanone, 2-methyl-4-propyl-1,3-oxathiane, 4-decanolide, ethyl 2-methyl-pentanoate, hexyl acetate, ethyl 2-methylbutanoate, gamma-nonalactone, allyl heptanoate, 2-phenoxyethyl isobutyrate, ethyl 2-methyl-1,3-dioxolane-2-acetate, 3-(3,3/1,1-dimethyl-5-indanyl)propanal, diethyl 1,4-cyclohexanedicarboxylate, 3-methyl-2-hexen-1-yl acetate, 1-[3,3-dimethylcyclohexyl]ethyl [3-ethyl-2-oxiranyl]acetate and/or diethyl 1,4-cyclohexane dicarboxylate;

Green ingredients: 2-methyl-3-hexanone (E)-oxime, 2,4-dimethyl-3-cyclohexene-1-carbaldehyde, 2-tert-butyl-1-cyclohexyl acetate, styrallyl acetate, allyl (2-methylbutoxy)acetate, 4-methyl-3-decen-5-ol, diphenyl ether, (Z)-3-hexen-1-ol and/or 1-(5,5-dimethyl-1-cyclohexen-1-yl)-4-penten-1-one;

Musk ingredients: 1,4-dioxa-5,17-cycloheptadecanedione, (Z)-4-cyclopentadecen-1-one, 3-methylcyclopentadecanone, 1-oxa-12-cyclohexadecen-2-one, 1-oxa-13-cyclohexadecen-2-one, (9Z)-9-cycloheptadecen-1-one, 2-{1S)-1-[(1R)-3,3-dimethylcyclohexyl]ethoxy}-2-oxoethyl propionate 3-methyl-5-cyclopentadecen-1-one, 1,3,4,6,7,8-hexahydro-4,6,6,7,8,8-hexamethyl-cyclopenta-g-2-benzopyrane, (1S,1'R)-2-[1-(3',3'-dimethyl-1'-cyclohexyl)ethoxy]-2-methylpropyl propanoate, oxacyclohexadecan-2-one and/or (1S,1'R)-[1-(3',3'-dimethyl-1'-cyclohexyl)ethoxycarbonyl]methyl propanoate;

Woody ingredients: 1-[(1RS,6SR)-2,2,6-trimethylcyclohexyl]-3-hexanol, 3,3-dimethyl-5-[(1R)-2,2,3-trimethyl-3-cyclopenten-1-yl]-4-penten-2-ol, 3,4'-dimethylspiro[oxirane-2,9'-tricyclo[6.2.1.0$^{2,7}$]undec[4]ene, (1-ethoxyethoxy)cyclododecane, 2,2,9,11-tetramethyl-spiro[5.5]undec-8-en-1-yl acetate, 1-(octahydro-2,3,8,8-tetramethyl-2-naphtalenyl)-1-ethanone, patchouli oil, terpenes fractions of patchouli oil, Clearwood®, (1'R,E)-2-ethyl-4-(2',2',3'-trimethyl-3'-cyclopenten-1'-yl)-2-buten-1-ol, 2-ethyl-4-(2,2,3-trimethyl-3-cyclopenten-1-yl)-2-buten-1-ol, methyl cedryl ketone, 5-(2,2,3-trimethyl-3-cyclopentenyl)-3-methylpentan-2-ol, 1-(2,3,8,8-tetramethyl-1,2,3,4,6,7,8,8a-octahydronaphthalen-2-yl)ethan-1-one and/or isobornyl acetate;

Other ingredients (e.g. amber, powdery spicy or watery): dodecahydro-3a,6,6,9a-tetramethyl-naphtho[2,1-b]furan and any of its stereoisomers, heliotropin, anisic aldehyde, eugenol, cinnamic aldehyde, clove oil, 3-(1,3-benzodioxol-5-yl)-2-methylpropanal, 7-methyl-2H-1,5-benzodioxepin-3(4H)-one, 2,5,5-trimethyl-1,2,3,4,4a,5,6,7-octahydro-2-naphthalenol, 1-phenylvinyl acetate, 6-methyl-7-oxa-1-thia-4-azaspiro[4.4]nonan and/or 3-(3-isopropyl-1-phenyl)butanal.

According to a particular embodiment, the invention's perfuming composition comprises, as a perfuming co-ingredient, at least one woody ingredient.

A perfumery base according to the invention may not be limited to the above mentioned perfuming co-ingredients, and many other of these co-ingredients are in any case listed in reference texts such as the book by S. Arctander, Perfume and Flavor Chemicals, 1969, Montclair, New Jersey, USA, or its more recent versions, or in other works of a similar nature, as well as in the abundant patent literature in the field of perfumery. It is also understood that said co-ingredients may also be compounds known to release in a controlled manner various types of perfuming compounds also known as properfume or profragrance. Non-limiting examples of suitable properfume may include 4-(dodecylthio)-4-(2,6,6-trimethyl-2-cyclohexen-1-yl)-2-butanone, 4-(dodecylthio)-4-(2,6,6-trimethyl-1-cyclohexen-1-yl)-2-butanone, trans-3-(dodecylthio)-1-(2,6,6-trimethyl-3-cyclohexen-1-yl)-1-butanone, 3,7-dimethyl-2,6-octadien-1-yl hexadecanoate or a mixture thereof.

By "perfumery adjuvant", it is meant here an ingredient capable of imparting additional added benefit such as a color, a particular light resistance, chemical stability, etc. A detailed description of the nature and type of adjuvant commonly used in perfuming composition cannot be exhaustive, but it has to be mentioned that said ingredients are well known to a person skilled in the art. One may cite as specific non-limiting examples the following: viscosity agents (e.g. surfactants, thickeners, gelling and/or rheology modifiers), stabilizing agents (e.g. preservatives, antioxidant, heat/light and or buffers or chelating agents, such as BHT), coloring agents (e.g. dyes and/or pigments), preservatives (e.g. antibacterial or antimicrobial or antifungal or anti irritant agents), abrasives, skin cooling agents, fixatives, insect repellants, ointments, vitamins and mixtures thereof.

It is understood that a person skilled in the art is perfectly able to design optimal formulations for the desired effect by admixing the above mentioned components of a perfuming composition, simply by applying the standard knowledge of the art as well as by trial and error methodologies.

An invention's composition consisting of at least one composition of matter as defined above and at least one perfumery carrier consists of a particular embodiment of the invention as well as a perfuming composition comprising at least one composition of matter as defined above, at least one perfumery carrier, at least one perfumery base, and optionally at least one perfumery adjuvant.

For the sake of clarity, it is also understood that any mixture resulting directly from a chemical synthesis, e.g. a reaction medium without an adequate purification, in which the composition of matter of the invention would be involved as a starting, intermediate or end-product could not be considered as a perfuming composition according to the invention as far as said mixture does not provide the inventive composition of matter in a suitable form for perfumery. Thus, unpurified reaction mixtures are generally excluded from the present invention unless otherwise specified.

The invention's composition of matter can also be advantageously used in all the fields of modern perfumery, i.e. fine or functional perfumery, to positively impart or modify the odor of a consumer product into which said composition of matter is added. Consequently, another object of the present invention consists of by a perfumed consumer product comprising, as a perfuming ingredient, at least one composition of matter, as defined above.

The invention's composition of matter can be added as such or as part of an invention's perfuming composition.

For the sake of clarity, "perfumed consumer product" is meant to designate a consumer product which delivers at least a pleasant perfuming effect to the surface or space to which it is applied (e.g. skin, hair, textile, or home surface). In other words, a perfumed consumer product according to the invention is a perfumed consumer product which comprises a functional formulation, as well as optionally additional benefit agents, corresponding to the desired consumer product, and an olfactive effective amount of at least one invention's composition of matter. For the sake of clarity, said perfumed consumer product is a non-edible product.

The nature and type of the constituents of the perfumed consumer product do not warrant a more detailed description here, which in any case would not be exhaustive, the skilled person being able to select them on the basis of his general knowledge and according to the nature and the desired effect of said product.

Non-limiting examples of suitable perfumed consumer products include a perfume, such as a fine perfume, a splash or eau de parfum, a cologne or a shave or after-shave lotion; a fabric care product, such as a liquid or solid detergent, a fabric softener, a liquid or solid scent booster, a fabric refresher, an ironing water, a paper, a bleach, a carpet cleaner, a curtain-care product; a body-care product, such as a hair care product (e.g. a shampoo, a coloring preparation or a hair spray, a color-care product, a hair shaping product, a dental care product), a disinfectant, an intimate care product; a cosmetic preparation (e.g. a skin cream or lotion, a vanishing cream or a deodorant or antiperspirant (e.g. a spray or roll on), a hair remover, a tanning or sun or after sun product, a nail product, a skin cleansing, a makeup); or a skin-care product (e.g. a soap, a shower or bath mousse, oil or gel, or a hygiene product or a foot/hand care products); an air care product, such as an air freshener or a "ready to use" powdered air freshener which can be used in the home space (rooms, refrigerators, cupboards, shoes or car) and/or in a public space (halls, hotels, malls, etc.); or a home care product, such as a mold remover, a furnisher care product, a wipe, a dish detergent or a hard-surface (e.g. a floor, bath, sanitary or a window-cleaning) detergent; a leather care product; a car care product, such as a polish, a wax or a plastic cleaner.

Some of the above-mentioned perfumed consumer products may represent an aggressive medium for the invention's composition of matter, so that it may be necessary to protect the latter from premature decomposition, for example by encapsulation or by chemically binding it to another chemical which is suitable to release the invention's ingredient upon a suitable external stimulus, such as an enzyme, light, heat or a change of pH.

The proportions in which the composition of matter according to the invention can be incorporated into the various aforementioned products or compositions vary within a wide range of values. These values are dependent on the nature of the article to be perfumed and on the desired organoleptic effect as well as on the nature of the co-ingredients in a given base when the composition of matter according to the invention are mixed with perfuming co-ingredients, solvents or additives commonly used in the art.

For example, in the case of perfuming compositions, typical concentrations are in the order of 0.001% to 30% by weight, or even more, of the composition of matter of the invention based on the weight of the composition into which they are incorporated. In the case of perfumed consumer product, typical concentrations are in the order of 0.0001% to 10% by weight, or even more, of the composition of matter of the invention based on the weight of the consumer product into which they are incorporated.

Another object of the present invention is a process for preparing a composition of matter as defined above. The process to prepare said composition comprises the thermal elimination of a mixture comprising i) 0.5 to 85% w/w of compound of formula

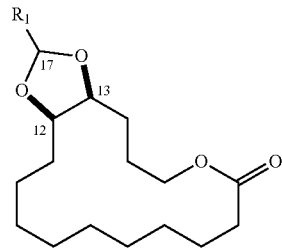

(I)

in the form of any one of its stereoisomers or a mixture thereof, and wherein $R^1$ represents a $OR^2$ or a $NR^2_2$ group wherein $R^2$ represents a $C_{1-3}$ alkyl group;

ii) 0.5 to 85% w/w of compound of formula

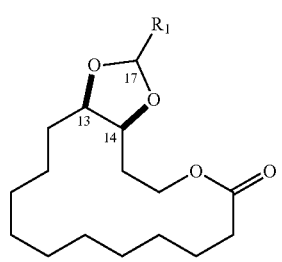

(II)

in the form of any one of its stereoisomers or a mixture thereof, and wherein $R^1$ has the same meaning as defined above;

iii) 0.5 to 30% w/w of compound of formula

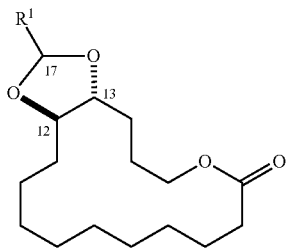
(III)

in the form of any one of its stereoisomers or a mixture thereof, and wherein $R^1$ has the same meaning as defined above; and iv) 0 to 30% w/w of compound of formula

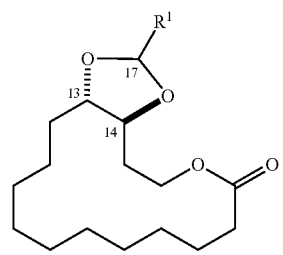
(IV)

in the form of any one of its stereoisomers or a mixture thereof, and wherein $R^1$ has the same meaning as defined above.

According to a particular embodiment, the process to prepare the invention's composition of matter comprises the thermal elimination of a mixture comprising i) 40 to 85% w/w of compound of formula

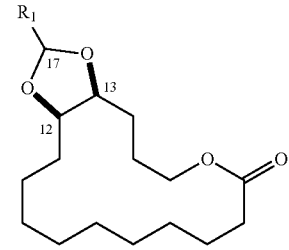
(I)

in the form of any one of its stereoisomers or a mixture thereof, and wherein $R^1$ represents a $OR^2$ or a $NR^2{}_2$ group wherein $R^2$ represents a $C_{1-3}$ alkyl group;

ii) 10 to 80% w/w of compound of formula

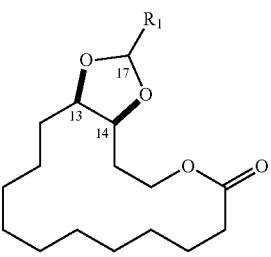
(II)

in the form of any one of its stereoisomers or a mixture thereof, and wherein $R^1$ has the same meaning as defined above;

iii) 2 to 25% w/w of compound of formula

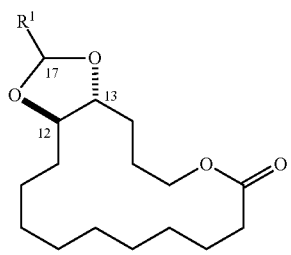
(III)

in the form of any one of its stereoisomers or a mixture thereof, and wherein $R^1$ has the same meaning as defined above; and iv) 1 to 30% w/w of compound of formula

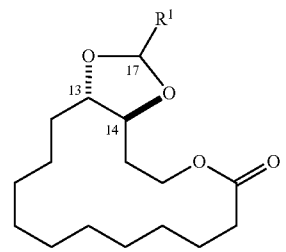
(IV)

in the form of any one of its stereoisomers or a mixture thereof, and wherein $R^1$ has the same meaning as defined above.

For the sake of clarity, by the expression "any one of its stereoisomers or a mixture thereof", or the similar, it is meant the normal meaning understood by a person skilled in the art, i.e. that the invention compound can be a pure or be in the form of a mixture of enantiomers or diastereoisomers (e.g. the carbon 17 could be R, S or a mixture thereof and compound 12 and 13 or 13 and 14 have the relative or absolute configuration as drawn). According to any one of the above embodiments of the invention, the stereocenter of carbon 17 may be R or S or a mixture thereof. The other stereocenters have a fixed stereochemistry; i.e. the carbon 12 and 13 or 13 and 14 of compounds of formula (I) to (IV) have an absolute (R or S) or relative configuration as defined in the drawings.

According to any one of the above embodiment, $R^1$ may represent a $OR^2$ group wherein $R^2$ may represent a $C_{1-3}$ alkyl group, particularly $R^2$ may represent a methyl or an ethyl group.

According to any one of the above embodiments, the thermal elimination is performed at a temperature between 120° C. and 220° C., preferably between 140° C. and 160° C.

According to any one of the above embodiments, the thermal elimination may be performed in presence of carboxylic acid or anhydride at typically temperature between 120-180° C.

According to any one of the above embodiments, the thermal elimination is a pyrolysis at higher temperature in the absence of a catalyst.

The reaction can be carried out in the presence or absence of a solvent. When a solvent is required or used for practical reasons, then any solvent current in such reaction type can be used for the purposes of the invention. Solvents with high boiling point are preferred. Non-limiting examples of solvents include DMSO, DMPU, DMF, DMA, NMP, high boiling aromatic solvents like mesitylene, xylene, diisopropyl benzene or carboxylic anhydrides or mixtures thereof. The choice of the solvent is function of the nature of the substrates and/or catalyst and the person skilled in the art is well able to select the solvent most suitable in each case to optimize the reaction.

According to any one of the above embodiment, the process for the preparation of the mixture comprising from 0.5 to 85% of compound of formula (I), from 0.5 to 85% of compound of formula (II), from 0.5 to 30% of compound of formula (III) and from 0 to 30% of compound of formula (IV) may comprise the following step:
a) the epoxidation of a composition comprising at least 70% of oxacyclohexadec-12-en-2-one and oxacyclohexadec-13-en-2-one with the double bond with E configuration and at most 30% of oxacyclohexadec-12-en-2-one and oxacyclohexadec-13-en-2-one with the double bond with Z configuration;
b) the hydrolysis of the mixture obtained in step a) to form a mixture of diols comprising
  i) 0.5 to 85% w/w of diol (12RS,13SR)-12,13-dihydroxyoxacyclohexadecan-2-one;
  ii) 0.5 to 85% w/w of diol (13RS,14SR)-13,14-dihydroxyoxacyclohexadecan-2-one;
  iii) 0.5 to 30% w/w of diol (12RS,13RS)-12,13-dihydroxyoxacyclohexadecan-2-one; and
  iv) 0 to 30% w/w of diol (13SR,14SR)-13,14-dihydroxyoxacyclohexadecan-2-one;
c) treating the diols obtained in step b) with a tri $C_{1-3}$ alkyl orthoformate or DMF acetal.

According to a particular embodiment, the process for the preparation of the mixture comprising from 40 to 85% of compound of formula (I), from 10 to 80% of compound of formula (II), from 2 to 25% of compound of formula (III) and from 1 to 30% of compound of formula (IV) may comprise the following step:
a) the epoxidation of a composition comprising at least 70% of oxacyclohexadec-12-en-2-one and oxacyclohexadec-13-en-2-one with the double bond with E configuration and at most 30% of oxacyclohexadec-12-en-2-one and oxacyclohexadec-13-en-2-one with the double bond with Z configuration;
b) the hydrolysis of the mixture obtained in step a) to form a mixture of diols comprising
  i) 40 to 85% w/w of diol (12RS,13SR)-12,13-dihydroxyoxacyclohexadecan-2-one;
  ii) 10 to 80% w/w of diol (13RS,14SR)-13,14-dihydroxyoxacyclohexadecan-2-one;
  iii) 2 to 25% w/w of diol (12RS,13RS)-12,13-dihydroxyoxacyclohexadecan-2-one; and
  iv) 1 to 30% w/w of diol (13SR,14SR)-13,14-dihydroxyoxacyclohexadecan-2-one;
c) treating the diols obtained in step b) with a tri $C_{1-3}$ alkyl orthoformate or DMF acetal.

The sequence of epoxidation, hydrolysis and formation of the dioxolane is a well-known sequence reported in *Chem. Lett.* 1986, 879. The person skilled in the art is well aware of the conditions to perform such transformations. The epoxidation may be performed with a peroxide-containing reagents such as hydrogen peroxide in the presence of a carboxylic acid or suitable metal catalyst or metal complex such as [Fe(BPMEN)(OTf)$_2$], TPA(Fe(OTf)$_2$ (*J. Am. Chem. Soc.*, 2007, 129, 15954), Mn, Fe (*ACS Catalysis*, 2018, 8, 4528, Mn(II) picolinic acid (*Org. Lett.*, 2016, 18, 2528), peracids such as peracetic acid, m-chloroperbenzoic acid or enzymatically. Non-exhaustive list of examples of suitable epoxidation conditions are disclosed in *Chem Rev.*, 2003, 103, 2457, *Chem Rev.* 2006, 106, 2943 or *Chem Rev.*, 1989, 89, 431. The person skilled in the art is well able to select the most convenient conditions. The hydrolysis may be carried out with a suitable organic acid or mineral acid, preferably in the presence of water, or enzymatically. The kinetic rate of hydrolysis may differ for all epoxides present in the mixture obtained in step a). The person skilled in the art is well able to select most appropriate conditions in order to favor the partial or complete hydrolysis of all epoxides. The epoxidation and hydrolysis can also be performed in the same vessel under suitable conditions known to a person skilled in the art.

The dioxolane formation may be performed with DMF acetal such as 1,1-dimethoxy-N,N-dimethylmethanamine or 1,1-ethoxy-N,N-dimethylmethanamine. Alternatively, the dioxolane formation may be performed with tri $C_{1-3}$ alkyl orthoformate such as trimethyl orthoformate or triethyl orthoformate and in the presence of an acid catalyst such as Amberlyst® A-15 or similar sulfonic acid or alternatively in the presence of a suitable carboxylic acid with or without the removal of the alcohol by product via heating. The formation of the ortho esters and subsequent elimination may also be performed in the same vessel if desired.

The selective hydrolysis of the 13 cis and 13 trans epoxides present in the overall mixture of 12 and 13 isomer epoxides could be achieved using a solvent such as ethyl formate in the presence of an acid catalyst in the absence of added water. Said conditions unexpectedly leads to the formation of (RS)-13-((SR)-1,3-dihydroxypropyl)oxacyclotridecan-2-one and (RS)-13-((RS)-1,3-dihydroxypropyl)oxacyclotridecan-2-one which are further converted into ((13RS,14SR)-13,14-dihydroxyoxacyclohexadecan-2-one and (13RS,14RS)-13,14-dihydroxyoxacyclohexadecan-2-one. Said conversion is carried out in the presence of a suitable acid such as camphor sulfonic acid in dichloromethane at ambient temperature.

In other words, depending on the conditions employed for the hydrolysis of the 13 isomer epoxides ((1RS,16RS)-4, 17-dioxabicyclo[14.1.0]heptadecan-5-one (trans) and (1SR, 16RS)-5,17-dioxabicyclo[14.1.0]heptadecan-6-one (cis) either in pure form or as part of the mixture, give (13RS, 14SR)-13,14-dihydroxyoxacyclohexadecan-2-one and (13SR,14SR)-13,14-dihydroxyoxacyclohexadecan-2-one and/or (RS)-13-((RS)-1,3-dihydroxypropyl)oxacyclotridecan-2-one and (RS)-13-((SR)-1,3-dihydroxypropyl)oxacyclotridecan-2-one.

The compounds of formula (I), (II), (III) and (IV), 13,14-dihydroxyoxacyclohexadecan-2-one, 12,13-dihydroxyoxacyclohexadecan-2-one and 13-(1,3-dihydroxypropyl)oxacyclotridecan-2-one are new. So a further object of the present invention is the compounds of formula (V)

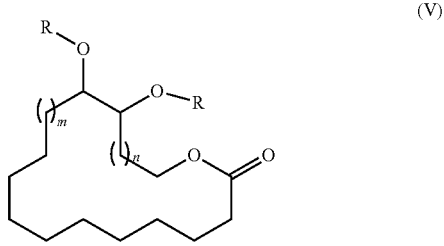

in a form of any one of theirs stereoisomers or a mixture thereof; and wherein when m is 1, then n is 1 or when m is 0, then n is 2; R groups represent a hydrogen or both R groups, taken together, represent a $C_{1-6}$ alkyl, a $CHOR^2$ or a $CHNR^2_2$ group wherein $R^2$ represents a $C_{1-3}$ alkyl group.

For the sake of clarity, by the expression "any one of its stereoisomers or a mixture thereof", or the similar, it is meant the normal meaning understood by a person skilled in the art, i.e. that the compounds of formula (V) can be a pure enantiomer or diastereomer or can be a mixture of enantiomers and/or diastereoisomers. In other words, the compounds of formula (V) may possess several stereocenters and each of said stereocenter can have two different stereochemistries (e.g. R or S). The compound of formula (V) may even be in the form of a pure enantiomer or in the form of a mixture of enantiomers or diastereoisomers. The compound of formula (V) can be in a racemic form or scalemic form. Therefore the compound of formula (V) can be one stereoisomers or in the form of a composition of matter comprising, or consisting of, various stereoisomers.

EXAMPLES

The invention will now be described in further detail by way of the following examples, wherein the abbreviations have the usual meaning in the art, the temperatures are indicated in degrees centigrade (° C.). NMR spectra were acquired using either a Bruker Avance II Ultrashield 400 plus operating at 400 MHz, ($^1$H) and 100 MHz ($^{13}$C) or a Bruker Avance III 500 operating at 500 MHz ($^1$H) and 125 MHz ($^{13}$C) or a Bruker Avance III 600 cryoprobe operating at 600 MHz ($^1$H) and 150 MHz ($^{13}$C). Spectra were internally referenced relative to tetramethyl silane 0.0 ppm. $^1$H NMR signal shifts are expressed in δ ppm, coupling constants (J) are expressed in Hz with the following multiplicities: s, singlet; d, doublet; t, triplet; q, quartet; m, multiplet; b, broad (indicating unresolved couplings) and were interpreted using Bruker Topspin software. $^{13}$C NMR data are expressed in chemical shift δ ppm and hybridization from DEPT 90 and DEPT 135 experiments, C, quaternary (s); CH, methine (d); $CH_2$, methylene (t); $CH_3$, methyl (q). GC method GC-23 (20 M, 0.18 mm, 0.2 um, $H_2$, 110° C. at 3° C./min).

Example 1

Synthesis of the Invention's Composition of
a) Epoxidation of Commercially Available Habanolide®
i. Buffered with Sodium Acetate)

Under an atmosphere of nitrogen, a solution of peracetic acid (39% aq, 108 mL, ca. 1.3 eq) was added slowly dropwise to a suspension of Habanolide® (100.0 g, 420 mmol, 92% pure) and sodium acetate (6.9 g, 0.2 eq) in DCM (400 mL) cooled to 0° C. in an ice bath. The emulsion was allowed to slowly warm to ambient temperature. After 21 hours at RT, then the mixture was diluted with ether. The organic phase was washed with water, carefully with saturated sodium bicarbonate solution, and with 5% sodium sulfite solution until Merck peroxide test strips were negative, then dried over anhydrous sodium sulfate, filtered and the solvents removed in vacuo to yield the crude epoxide mixture, 105 g. The lighter impurities were removed via distillation with a 30 cm Fischer column, 0.1 mbar, 180-190° C. to give 9.0 g head fraction containing Exaltolide and co-eluting impurities. The residue (93 g) was redistilled by Kügelrohr bulb to bulb distillation 0.1 mbar, 155-160° C. gave 85.6 g (81%) of the epoxide mixture (13E (25.4%), 12 E (45.2%), 13 Z (7.6%), 12 Z, (19.8%)), plus 2.7 g residue.

(1SR,16SR)-5,17-dioxabicyclo[14.1.0]heptadecan-6-one $^1$H NMR (500 MHz, CDCl$_3$): δ 1.13-1.22 (m, 1H), 1.23-1.40 (m, 10H), 1.45-1.53 (m, 2H), 1.65-1.73 (m, 4H), 1.74-1.89 (m, 2H), 2.00 (ddd, J 13.7, 8.7, 5.0, 1H), 2.28-2.41 (m, 2H), 2.64 (dt, J 8.7, 2.7, 1H), 2.74 (td, J 5.6, 2.1, 1H), 4.13-4.25 (m, 2H) ppm.
$^{13}$C NMR (90 MHz, CDCl$_3$): δ 25.0 (t), 25.2 (t), 27.3 (t), 27.4 (t), 27.5 (t), 27.9 (t), 28.0 (t), 28.1 (t), 30.8 (t), 34.5 (t), 58.5 (d), 58.6 (d), 62.9 (t), 173.8 (s) ppm.

(1RS,16RS)-4,17-dioxabicyclo[14.1.0]heptadecan-6-one $^1$H NMR (500 MHz, CDCl$_3$): δ 1.20-1.54 (m, 15H), 1.67 (bq, J 6.8, 2H), 1.77-1.85 (m, 1H), 1.89-1.96 (m, 2H), 2.31 (dt, J 14.2, 7.1, 1H), 2.41 (dt, J 14.2, 6.9, 1H), 2.71 (ddd, J 8.1, 3.6, 2.2, 1H), 2.84, (td, J 5.5 2.2, 1H), 4.16, (ddd, J 11.3, 8.8, 2.6, 1H), 4.32 (ddd, J 11.3, 6.7, 3.1, 1H) ppm.
$^{13}$C NMR (125 MHz, CDCl$_3$): δ 24.3 (t), 24.6 (t), 26.3 (t), 26.4 (t), 26.4 (t), 26.5 (t), 26.9 (t), 27.2 (t), 30.2 (t), 31.6 (t), 34.2 (t), 56.6 (d), 58.6 (d), 61.0 (t), 173.7 (s) ppm.

(1SR,16RS)-5,17-dioxabicyclo[14.1.0]heptadecan-6-one $^1$H NMR (500 MHz, CDCl$_3$): δ 1.23-1.95 (m, 20H), 2.33 (t, J 6.6, 2H), 2.90-2.97 (m, 2H); 4.14 (ddd, J 11.1, 8.1, 3.3, 1H), 4.23 (ddd, J 10.9, 6.9, 3.7, 1H) ppm.
$^{13}$C NMR (90 MHz, CDCl$_3$): δ 24.1 (t), 24.9 (t), 25.1 (t), 26.0 (t), 26.3 (t), 27.1 (t), 27.2 (t), 27.3 (t), 27.8 (t), 34.3 (t), 56.6 (d), 57.1 (d), 63.7 (t), 173.9 (s) ppm.

(1SR,16RS)-4,17-dioxabicyclo[14.1.0]heptadecan-6-one $^1$H NMR (500 MHz, CDCl$_3$): δ 1.20-1.58 (m, 16H), 1.60-1.75 (m, 2H), 1.80-1.98 (m, 2H), 2.26-2.38 (m, 2H), 2.92-2.99 (m, 2H), 4.30 (t, J 6.9, 2H) ppm.
$^{13}$C NMR (125 MHz, CDCl$_3$): δ 24.1 (t), 24.6 (t), 26.4 (t), 26.6 (t), 26.6 (t), 26.7 (t), 26.9 (t), 27.0 (t), 27.3 (t), 27.7 (t), 34.4 (t), 54.4 (d), 56.7 (d), 61.8 (t), 173.9 (s) ppm.

ii. Un-Buffered

Under an atmosphere of nitrogen, a solution of peracetic acid (39% aq, 12.5 mL, ca. 1.3 eq) was added slowly dropwise to a solution of Habanolide® (11.0 g, 46.1 mmol)

in DCM (50 mL) cooled to 0° C. in an ice bath. The emulsion was allowed to slowly warm to RT over 2 hours and stirred for a further 15 hrs at RT then diluted with ether. The organic phase was washed with water, carefully with saturated sodium bicarbonate solution, and with 5% sodium sulfite solution until Merck peroxide test strips were negative, then dried over anhydrous sodium sulfate, filtered and the solvents removed in vacuo to yield the crude epoxide mixture, 12.1 g. Further purification by chromatography (Puriflash 330 g cartridge 30 uM) with heptane:MTBE (95:5 gradient to 60:40) as eluant gave Pure (1SR,16SR)-5,17-dioxabicyclo[14.1.0]heptadecan-6-one, 1.0 g. Pure (1SR,16RS)-5,17-dioxabicyclo[14.1.0]heptadecan-6-one, 0.9 g. Then further elution gave the diols as a mixture of isomers, 3.2 g.

b) Hydrolysis of Epoxides Obtained in Step a) i. Into Diols

A solution of the epoxide mixture prepared in step a) i. (30.0 g, 118 mmol) in THF (250 mL) and 5% $H_2SO_4$ (50 mL) was heated under reflux (65° C.) for 10 hours then cooled and diluted with ether. The organic phase was washed with water, saturated sodium bicarbonate solution, dried over anhydrous sodium sulfate, filtered and the solvents removed in vacuo to yield a mixture of diols (27.2 g, 84%) which was used directly in the next step without further purification.

c) Conversion of Mixture of Diols Obtained in Step b) in Ortho Esters

Amberlyst® A-15 (5.5 g) was added to a stirred solution of the diol mixture prepared in step b) (27.0 g, 99 mmol) and trimethylorthoformate (40.0 g, 377 mmol) and the suspension stirred at ambient temperature for 6 hours. Solid sodium carbonate (500 mg) and ether (50 mL) were added and the suspension stirred for a further 30 minutes, then filtered and the solvents removed in vacuo to yield the crude ortho esters as a mixture of isomers, 29.0 g, 93%.

d) Elimination of Ortho Esters Obtained in Step c)

i. Elimination with Acetic Anhydride

A solution of the ortho esters obtained in step c) (29.0 g, 92 mmol) and acetic anhydride (50 mL) was heated at reflux (140° C.) for 7 hours then cooled and diluted with ether and water. Allowed to stir at RT for 30 minutes, the organic phase washed several times with saturated sodium bicarbonate solution, brine, dried over anhydrous sodium sulfate, filtered and the solvents removed in vacuo to yield crude Habanolide, 24.4 g. Further purification by Kügelrohr bulb to bulb distillation 0.5 mbar at 140-145° C. gave the invention's composition of matter comprising about 63% w/w of (Z)-oxacyclohexadec-12-en-2-one, about 16% w/w of (E)-oxacyclohexadec-12-en-2-one, about 7.4% w/w of (E)-oxacyclohexadec-13-en-2-one and about 13% w/w of (Z)-oxacyclohexadec-13-en-2-one, 12.65 g (Z:E, 75:25).

(Z)-oxacyclohexadec-12-en-2-one $^1$H NMR (500 MHz, CDCl$_3$): δ 1.20-1.42 (m, 12H), 1.64-1.76 (m, 4H), 2.04 (q, J 6.9, 2H), 2.14-2-22 (m, 2H), 2.30 (m, 2H), 4.14 (bt, J 5.4, 2H), 5.30-5.44 (m, 2H) ppm.
$^{13}$C NMR (90 MHz, CDCl$_3$): δ 24.2 (t), 24.7 (t), 26.2 (t), 26.3 (t), 26.9 (t), 27.0 (t), 27.6 (t), 29.2 (t), 34.2 (t), 63.6 (t), 128.6 (d), 131.0 (d), 173.9 (s) ppm.

(Z)-oxacyclohexadec-13-en-2-one $^1$H NMR (500 MHz, CDCl$_3$): 31.25-1-40 (m, 15H), 1.62-1.69 (m, 2H), 2.05 (q, J 7, 2H), 2.29 (t, J 7.2, 2H), 2.41 (bq, J 6.4, 1H), 4.12 (t, J 6.6, 2H), 5.30-5.37 (m, 1H), 5.50-5.57 (m, 1H) ppm.

$^{13}$C NMR (90 MHz, CDCl$_3$): δ 24.1 (t), 25.8 (t), 26.3 (t), 26.5 (t), 26.7 (t), 26.9 (t), 27.2 (t), 28.1 (t), 34.5 (t), 63.9 (t), 125.4 (d), 132.7 (d), 174.1 (s) ppm.

(E)-oxacyclohexadec-13-en-2-one $^1$H NMR (500 MHz, CDCl$_3$): δ 1.24-1.41 (m, 12H), 1.63-1.71 (m, 3H), 2.00-2.08 (m, 3H), 2.27-2.37 (m, 4H), 4.08-4.16 (m, 2H), 5.39-5.50 (m, 2H) ppm.
$^{13}$C NMR (125 MHz, CDCl$_3$): δ 24.1 (t), 25.7 (t), 25.9 (t), 26.0 (t), 26.3 (t), 26.6 (t), 26.9 (t), 27.9 (t), 31.4 (t), 31.9 (t), 34.0 (t), 64.1 (t), 127.0 (d), 132.7 (d), 174.2 (s) ppm.

(E)-oxacyclohexadec-12-en-2-one $^1$H NMR (500 MHz, CDCl$_3$): δ 1.20-1.38 (m, 12H), 1.65-1.77 (m, 4H), 2.04 (q, J 6.1, 2 H), 2.16 (q, J 6.4, 2H), 2.31-2.34 (m, 2H), 4.09 (t, J 6.2, 2H), 5.32-5.45 (m, 2H) ppm.
$^{13}$C NMR (125 MHz, CDCl$_3$): 324.9 (t), 25.6 (t), 26.4 (t), 26.5 (t), 27.2 (t), 27.2 (t), 27.6 (t), 27.6 (t), 28.4 (t), 31.6 (t), 34.0 (t), 62.7 (t), 128.8 (d), 132.0 (d), 174.4 (s) ppm.

ii. Elimination without Acid

A mixture of the ortho esters as prepared in step c) was heated at 200° C. at 20 mbar then at 15 mbar, the distillate was analysed by GC. Habanolide ca. 65% (63% w/w of (Z)-oxacyclohexadec-12-en-2-one, about 16% w/w of (E)-oxacyclohexadec-12-en-2-one, about 7.4% w/w of (E)-oxacyclohexadec-13-en-2-one and about 13% w/w of (Z)-oxacyclohexadec-13-en-2-one) and ortho esters ca. 20-25%.

iii. Thermolysis with Non-Volatile Acid

A mixture of the ortho esters as prepared in step c) and tetracosanedioic acid 1% by weight was heated at 200° C. at 20 mbar then at 15 mbar or 150° C. at 5 mbar, the distillate was analysed by GC. Invention's composition of matter ca. 85% (63% w/w of (Z)-oxacyclohexadec-12-en-2-one, about 16% w/w of (E)-oxacyclohexadec-12-en-2-one, about 7.4% w/w of (E)-oxacyclohexadec-13-en-2-one and about 13% w/w of (Z)-oxacyclohexadec-13-en-2-one) and ortho esters ca. 7%.

Example 2

Synthesis of the Invention's Composition of Matter a) Selective Hydrolysis of (1SR,16RS)-4,17-dioxabicyclo[14.1.0]heptadecan-6-one and (1RS,16RS)-4,17-dioxabicyclo[14.1.0]heptadecan-6-one The epoxide mixture obtained in example 1 a) i. (15.0 g, 59 mmol) was dissolved in ethyl formate (30 mL) and Amberlyst® A-15 (750 mg, 5% weight) added the suspension was stirred at ambient temperature for 22 hrs then poured into saturated NaHCO$_3$, re extracted the aqueous phase with EtOAc, washed the organic phase with brine, dried over MgSO$_4$, filtered and the solvents removed in vacuo, to yield the mixture of diols and epoxides, as a colourless liquid. Filtration through a small plug of silica (100 mL) with 1:9 EtOAc:heptane (2×250 mL) fr 1 and fr 2 gave a mixture of (1SR,16SR)-5,17-dioxabicyclo[14.1.0] heptadecan-6-one and (1SR,16RS)-5,17-dioxabicyclo[14.1.0]heptadecan-6-one, 7.0 g (trans:cis, 80:20). Further elution with 1:6 EtOAc:heptane (2×100 mL). Then 70:30 EtOAc:Heptane as eluent (500 mL) and finally EtOAc (500 mL) gave a mixture of (SR)-13-((RS)-1,3-dihydroxypropyl)

oxacyclotridecan-2-one and (SR)-13-((SR)-1,3-dihydroxypropyl)oxacyclotridecan-2-one, as an oil, 6.5 g.

(SR)-13-((RS)-1,3-dihydroxypropyl)oxacyclotridecan-2-one $^1$H NMR (500 MHz, CDCl$_3$): 31.18-1.87 (m, 15H), 2.03-2.11 (m, 1H), 2.31-2-37 (m, 2H), 2.41-2.47 (m, 1H), 2.85 (bs, 2H), 3.61-3.89 (m, 4H), 4.89 (td, J 7.9, 4.1, 1H) ppm.
$^{13}$C NMR (125 MHz, CDCl$_3$): δ 21.1 (t), 23.6 (t), 24.0 (t), 24.8 (t), 25.5 (t), 25.8 (t), 25.9 (t), 26.3 (t), 31.1 (t), 34.1 (t), 34.6 (t), 58.6 (t), 72.2 (d), 74.3 (d), 174.3 (s) ppm.

b) Isomerisation of (SR)-13-((RS)-1,3-dihydroxypropyl)oxacyclotridecan-2-one and (SR)-13-((SR)-1,3-dihydroxypropyl)oxacyclotridecan-2-one into (13SR,14RS)-13,14-dihydroxyoxacyclohexadecan-2-one and (13SR,14SR)-13,14-dihydroxyoxacyclohexadecan-2-one The diol mixture prepared above (6.5 g) was dissolved in DCM (50 mL) and racemic camphor sulfonic acid (100 mg) was added and the mixture stirred overnight at ambient temperature. Diluted with saturated NaHCO$_3$, re extracted with DCM, washed organic phase with brine, dried over MgSO$_4$, filtered and the solvents removed in vacuo to yield the crude mixture comprising (13SR,14RS)-13,14-dihydroxyoxacyclohexadecan-2-one and (13SR,14SR)-13,14-dihydroxyoxacyclohexadecan-2-one, 6.0 g.

(13SR,14RS)-13,14-dihydroxyoxacyclohexadecan-2-one $^1$H NMR (500 MHz, CDCl$_3$): 31.20-1.86 (m, 19H), 2.20-2.49 (m, 3H), 3.76 (dt, J 10.3, 2.9, 1H), 3.85 (ddd, J 8.6, 5.5, 3.2, 1H), 4.29-4.41 (m, 2H) ppm.
$^{13}$C NMR (125 MHz, CDCl$_3$): δ 23.1 (t), 24.5 (t), 25.3 (t), 26.0 (t), 26.3 (t), 26.4 (t), 27.0 (t), 27.3 (t), 28.9 (t), 32.2 (t), 34.5 (t), 60.7 (t), 69.1 (d), 74.0 (d), 174.3 (s) ppm.

(13SR,14SR)-13,14-dihydroxyoxacyclohexadecan-2-one $^{13}$C NMR (125 MHz, CDCl$_3$): δ 22.4, 24.7, 25.5, 26.2, 26.3, 26.4, 27.0, 27.6, 32.5, 33.4, 34.4 60.7 (t), 68.6, 73.3 (d), 174.4 (s) ppm.

c) Formation of Ortho Esters

A suspension of the (13SR,14RS)-13,14-dihydroxyoxacyclohexadecan-2-one and (13SR,14SR)-13,14-dihydroxyoxacyclohexadecan-2-one mixture prepared above (3.0 g) in trimethyl orthoformate (10 mL) and Amberlyst® A-15 (250 mg) was stirred at ambient temperature for 4 hours. The suspension was then poured into saturated NaHCO$_3$, the aqueous phase was re extracted with EtOAc, the organic phase was washed with brine, dried over MgSO$_4$, filtered and the solvents removed in vacuo, to yield the mixture of ortho esters (3.5 g), as a colourless liquid which was used without further purification in the next step.

(3aSR,17aRS)-2-methoxytetradecahydro-7H-[1,3]dioxolo[4,5-d][1]oxacyclohexadecin-7-one $^1$H NMR (500 MHz, D$_5$ Pyridine): δ1.05-1.40 (m, 15H), 1.50-1.80 (m, 6H), 2.33 (t, J 6.2, 2H), 3.36 (s, 3H), 4.23-4.60 (m, 3H), 5.96 (s, 1H) ppm. (Minor isomers present at 3.38, 3.35, 3.33 and 6.02, 6.00, 5.92 ppm.)
$^{13}$C NMR (125 MHz, D$_5$ Pyridine): δ 23.4 (t), 25.2 (t), 25.3 (t), 26.4 (t), 27.0 (t), 27.3 (t), 27.4 (t), 27.5 (t), 27.6 (t), 27.7 (t), 28.4, 28.8 (t), 29.4, 29.9 (t), 34.7, 34.8 (t), 51.3, 51.6 (q), 61.3, (t), 75.4, (d), 77.3, (d), 78.3 (d) 115.1, (d), 173.4, 173.3 (s) ppm; (Minor isomers at 116.4, 116.2, 116.0 and 60.9, 60.8, 74.7 ppm.)

d) Elimination of Ortho Esters

A solution of the crude orthoesters prepared above, (5.2 g, 16.5 mmol) was heated with acetic anhydride (10 mL, 98 mmol) was heated (in 4×1.7 g, 5.4 mmol) lots using an Anton Parr Monowave 50 machine) at 150° C. for 60 mins then cooled. The lots were combined, diluted with ether and water. The organic phase washed with water, then stirred with saturated NaHCO$_3$ for 30 minutes. The organic phase was washed again with saturated NaHCO$_3$ solution, brine, dried over anhydrous sodium sulfate, filtered and the solvents removed in vacuo to yield the crude Habanolide mixture, 4.2 g. Kügelrohr bulb to bulb distillation (130-135° C. at 0.8 mbar) gave a mixture comprising 1.7% w/w of (Z)-oxacyclohexadec-12-en-2-one, about 1.1% w/w of (E)-oxacyclohexadec-12-en-2-one, about 15.9% w/w of (E)-oxacyclohexadec-13-en-2-one and about 81.3% w/w of (Z)-oxacyclohexadec-13-en-2-one (2.1 g).

Example 3

Synthesis of the Invention's Composition of Matter a) Hydrolysis of a Mixture Comprising (1SR,16SR)-5,17-dioxabicyclo[14.1.0]heptadecan-6-one and (1SR,16RS)-5,17-dioxabicyclo[14.1.0]heptadecan-6-one A solution of (1SR,16SR)-5,17-dioxabicyclo[14.1.0]heptadecan-6-one and (1SR,16RS)-5,17-dioxabicyclo[14.1.0]heptadecan-6-one obtained in fraction 1 and 2 of example 2 a) (5.5 g, trans: cis, 80:20) in THF (20 mL) and 10% H$_2$SO$_4$ (5 mL) was heated at 65° C. for 2 hours then cooled. Diluted with saturated NaHCO$_3$, re extracted with EtOAc, organic phase washed with brine, dried over MgSO$_4$, filtered and the solvents removed in vacuo to yield the crude diol mixture, 5.8 g.

(12RS,13SR)-12,13-dihydroxyoxacyclohexadecan-2-one $^1$H NMR (500 MHz, CDCl$_3$): δ 1.24-1.75 (m, 18H), 1.85-1.95 (m, 1H9, 2.34 (t, J 6.8, 2H), 3.68-3.75 (m, 2H), 4.06 (ddd, J 11.2, 8.4, 3.0, 1H), 4.31 (ddd, J 11.0, 6.4, 3.8, 1H) ppm.
$^{13}$C NMR (125 MHz, CDCl$_3$): δ 22.8 (t), 24.8 (t), 25.3 (t), 25.7 (t), 26.5 (t), 26.6 (t), 26.9 (t), 27.3 (t), 27.8 (t), 29.8 (t), 34.3 (t), 63.7 (t), 73.2 (d), 73.8 (d), 174.0 (s) ppm.

(12SR,13SR)-12,13-dihydroxyoxacyclohexadecan-2-one $^1$H NMR (500 MHz, CDCl$_3$): δ 1.24-1.50 (m, 20H), 1.56-1.92 (m, 4H), 2.33 (m-8, J 6.8, 1H), 3.41-3.50 (m, 1H), 4.18 (m-5, J 3.5, 1H) ppm.
$^{13}$C NMR (125 MHz, CDCl$_3$): 922.1 (t), 24.6 (t) 24.9 (t), 25.7 (t), 26.3 (t), 26.5 (t), 27.0 (t), 27.8 (t), 29.7 (t), 31.5 (t), 34.4 (t), 63.8 (t), 73.6 (d), 74.5 (d), 174.0 (s) ppm.

b) Formation of Ortho Esters

A suspension of the mixture comprising (12RS,13SR)-12,13-dihydroxyoxacyclohexadecan-2-one and (12SR,13SR)-12,13-dihydroxyoxacyclohexadecan-2-one (5.0 g) in trimethyl orthoformate (10 mL) and Amberlyst® A-15 (250 mg) was stirred at ambient temperature for 4 hours. The suspension was then poured into saturated NaHCO$_3$, the aqueous phase re extracted with EtOAc, the organic phase was washed with brine, dried over MgSO$_4$, filtered and the solvents removed in vacuo, to yield the mixture of ortho esters 6.0 g, as a colourless liquid which was used without further purification in the next step.

(3aSR,17aRS)-2-methoxytetradecahydro-8H-[1,3] dioxolo[4,5-e][1]oxacyclohexadecin-8-one $^1$H NMR (500 MHz, D$_5$ Pyridine): δ 1.07-1.95 (m, 20H), 2.35 (bt, J 6.7, 2H), 3.37 (s, 3H), 4.05-4.20 (m, 2H), 4.25-4.41 (m, 2H), 5.98 (s, 1H) ppm.
$^{13}$C NMR (125 MHz, D$_5$ Pyridine): δ 23.8 (t), 24.9 (t), 25.6 (t), 26.3 (t), 26.6 (t), 26.8 (t), 26.9 (t), 27.2 (t), 28.1 (t), 28.7 (t), 34.2 (t), 51.2 (q), 64.0 (t), 77.6, (d), 77.7 (d) 115.1 (d), 173.5 (s) ppm.
Minor Diastereoisomer Peaks
$^1$H NMR (500 MHz, D$_5$ Pyridine): δ 3.38 (s, 3H), 5.92 (s, 1H) ppm.
$^{13}$C NMR (125 MHz, D$_5$ Pyridine): δ 23.9 (t), 25.0 (t), 25.7 (t), 26.9 (t), 27.0 (t), 27.2 (t), 28.2 (t), 28.9 (t), 34.3 (t), 51.3 (q), 63.9 (t), 77.3, (d), 78.6 (d) 116.3 (d), 173.5 (s) ppm.

(3aSR,17aSR)-2-methoxytetradecahydro-8H-[1,3] dioxolo[4,5-e][1]oxacyclohexadecin-8-one (1:1 mixture of diastereoisomers)

$^1$H NMR (500 MHz, D$_5$ Pyridine): δ 1.14-1.95 (m, 22H), 2.27-2.41 (m, 2H), 2.53 (bt, J 6.7, 1H), 3.35 (s, 3H), 3.78-3.83 (m, 1H), 3.96-4.02 (m, 1H), 4.10-4.17 (m, 1H), 4.26-4.32 (m, 1H), 6.00, 6.02 (each s, 1H) ppm.
$^{13}$C NMR (125 MHz, D$_5$ Pyridine): δ 24.0, 24.1, 25.0, 25.1, 25.6, 25.8, 26.7, 26.7, 26.9, 26.9, 26.9, 27.0, 27.3, 27.3, 27.8, 27.9, 30.0, 30.8, 31.8, 32.5, 34.4 (t), 50.8, 51.0 (q), 63.4, 63.5 (t), 79.5, 79.7 (d), 81.0, 81.3 (d), 115.9, 116.0 (d), 173.4 (s) ppm.

c) Elimination of Ortho Esters
i. Elimination with Acetic Anhydride

The Elimination was performed as in example 1 d) i. starting with a mixture of the ortho esters as prepared above and gave 76% w/w of (Z)-oxacyclohexadec-12-en-2-one, about 18% w/w of (E)-oxacyclohexadec-12-en-2-one, about 1% w/w of (E)-oxacyclohexadec-13-en-2-one and about 2% w/w of (Z)-oxacyclohexadec-13-en-2-one.

ii. Elimination with Acetic Anhydride Under Pressure

A solution of the crude orthoesters prepared from example 3 b) (6.1 g, 19.4 mmol) was heated with acetic anhydride (10 mL, 98 mmol) (in 4×4 g lots using an Anton Parr Monowave machine) at 150° C. for 60 mins then cooled. The lots were combined, diluted with ether and water. The organic phase washed with water, then stirred with saturated NaHCO$_3$ for 30 minutes. The organic phase was washed again with saturated NaHCO$_3$ solution, brine, dried over anhydrous sodium sulfate, filtered and the solvents removed in vacuo to yield the crude Habanolide mixture, 4.3 g. Further purification by flash chromatography (200 g cartridge, 40 micron) with gradient elution 1:99 to 1:9 EtOAc:Heptane followed by Kügelrohr bulb to bulb distillation (130-135° C. at 0.8 mbar) gave 70% w/w of (Z)-oxacyclohexadec-12-en-2-one, 23.4% w/w of (E)-oxacyclohexadec-12-en-2-one, about 0.6% w/w of (E)-oxacyclohexadec-13-en-2-one and about 4% w/w of (Z)-oxacyclohexadec-13-en-2-one (1.95 g).

Example 4

Synthesis of the Invention's Composition of Matter—One Pot Formation of the Ortho Ester and Elimination A suspension of a mixture comprising (13SR,14RS)-13, 14-dihydroxyoxacyclohexadecan-2-one and (13SR,14SR)- 13,14-dihydroxyoxacyclohexadecan-2-one (in a respective ratio of 75:25 obtained in example 2 b) (1.5 g, 5.5 mmol) citric acid (48 mg, cat.) and trimethyl orthoformate (3.5 g, xs) was heated in Anton Paar Monowave 450 at 75° C. for 30 mins then at 175° C. for a further 4 hours. The reaction was cooled diluted with satd NaHCO$_3$, re extracted with EtOAc, washed organic phase with brine, dried over MgSO$_4$, filtered and the solvents removed in vacuo to yield (E)-oxacyclohexadec-13-en-2-one and (Z)-oxacyclohexadec-13-en-2-one, 1.5 g Further purification by Kügelrohr bulb to bulb distillation at 135-145° C. at 5.0×10-1 mbar gave (Z)-oxacyclohexadec-13-en-2-one: (E)-oxacyclohexadec-13-en-2-one (75:24), 0.73 g.

DB-23 analysis 12E (1.2%), 13E (21.7%), 13Z (76%), 12Z (1.2%)

Example 5

Synthesis of the Invention's Composition of Matter a) Hydrolysis of (1RS,16RS)-4,17-dioxabicyclo [14.1.0]heptadecan-6-one, (1SR,16RS)-4,17-dioxabicyclo[14.1.0]heptadecan-6-one, (1SR,16SR)-5, 17-dioxabicyclo[14.1.0]heptadecan-6-one and (1SR, 16RS)-5,17-dioxabicyclo[14.1.0]heptadecan-6-one The mixture of epoxides as prepared in examples 1 a) i. (above, 9.0 g, 35.4 mmol) was dissolved in THF (27 g) containing 10% H$_2$SO$_4$ (4.0 g) and heated at 70° C. for 3 hours then cooled. Saturated NaHCO$_3$ was added and the aqueous phase extracted with EtOAc, the combined organic phase washed with brine, dried over MgSO$_4$, filtered and the solvents removed in vacuo to yield the crude diol mixture 6.8 g. This diol mixture (6.8 g, 25 mmol) was dissolved in DCM (50 ml) and CSA (100 mg) added and the solution stirred overnight at ambient temperature. Saturated NaHCO$_3$ was added and the aqueous phase was extracted with DCM, the combined organic phase washed with brine, dried over MgSO$_4$, filtered and the solvents removed in vacuo to yield the crude diol mixture, 6.3 g, 23.2 mmol, 65%.

b) Formation of Ortho Esters

Amberlyst A-15 (0.95 g) was added to the diol mixture prepared above (6.3 g, 23.2 mmol) in trimethyl orthoformate (12.0 g, 11.3 mmol) and stirred at ambient temperature for 90 minutes, then filtered. The filtrate was diluted with ether, washed with saturated NaHCO$_3$ solution, dried over anhydrous Na$_2$SO$_4$, filtered and the solvent removed in vacuo to yield the crude orthoesters are a complex mixture of isomers, 7.1 g which was used without purification in the next step.

c) Elimination of Ortho Esters

Using an Anton Parr Monowave 50 Machine, a mixture of the crude orthoester prepared in above step b) (1.5-1.7 g, 4.8-5.4 mmol) in acetic anhydride (2.0 g, 19.6 mmol) was heated at 150° C. for 60 minutes then cooled. This was repeated 5 times and all lots were combined together. The excess acetic anhydride was destroyed by dilution with ether and water. The organic phase was again with water, then stirred with saturated NaHCO$_3$ for 30 minutes. The organic phase was washed again with saturated NaHCO$_3$ solution, brine, dried over anhydrous sodium sulfate, filtered and the solvents removed in vacuo to yield the crude mixture. Kügelrohr bulb to bulb distillation (130-135° C. at 0.8 mbar) gave 40.1% w/w of (Z)-oxacyclohexadec-12-en-2-one, about 16.7% of (E)-oxacyclohexadec-12-en-2-one, about 7.5% w/w of (E)-oxacyclohexadec-13-en-2-one and about 33.5% w/w of (Z)-oxacyclohexadec-13-en-2-one (3.0 g, 12.6 mmol).

Example 6

Synthesis of the Invention's Composition of Matter—Formation of N,N, Dimethyl Orthoamides
General Procedure The diol 0.5-1.0 mmol was dissolved in DMF dimethoxy acetal (1.0 g) and the solution heated at 100° C. for 60 mins then cooled, diluted with MTBE, washed with water, NaHCO$_3$, brine, dried over MgSO$_4$, filtered and the solvents removed under vacuum to yield the desired orthoamide as a 1:1 mixture of diastereoisomers.

(3aSR,17aRS)-2-(dimethylamino)tetradecahydro-8H-[1,3]dioxolo[4,5-e][1]oxacyclohexadecin-7-one $^1$H NMR (500 MHz, Pyridine d-5): S 1.06-2.00 (m, 18H), 2.31-2.37 (m, 2H), 2.40, 2.43 (s, each 3H), 3.97-4.05 (m, 1H), 4.14-4.19 (m, 1H), 4.21 (m-5, J 4.9, 1H), 4.27-4.43 (m, 2H), 4.48-4.60 (m, 1H), 5.54, 5.66 (s, each 1H) ppm.
$^{13}$C NMR (125 MHz, Pyridine d-5): S 23.2, 23.4, 24.8, 25.2, 25.4, 26.3, 26.6, 27.0, 27.1, 27.2, 27.4, 27.5, 27.6, 27.6, 27.7, 27.7, 27.8, 28.5, 28.6, 28.9, 30.3, 34.7, 34.8 (t), 37.1, 37.2 (d), 61.4, 61.6 (t), 73.2, 75.7, 77.0, 78.3 (d), 111.7, 112.4 (d), 173.4, 173.5 (s) ppm.

(3aSR,17aSR)-2-(dimethylamino)tetradecahydro-8H-[1,3]dioxolo[4,5-e][1]oxacyclohexadecin-7-one (1:1 mixture of diastereoisomers)

$^{13}$C NMR (125 MHz, Pyridine d-5): δ 60.9, 61.0 (t), 76.7, 77.2, 79.9, 80.2 (d), 112.3, 112.8 (d) ppm.

(3aRS,17aSR)-2-(dimethylamino)tetradecahydro-8H-[1,3]dioxolo[4,5-e][1]oxacyclohexadecin-8-one (1:1 mixture of diastereoisomers)

$^1$H NMR (500 MHz, D$_5$ Pyridine): δ1.13-1.95 (m, 20H), 2.31-2.38 (m, 2H), 2.41, 2.44 (s, each 3H), 3.92-4.04 (m, 1H), 4.06-4.13 (m, 1H), 4.14-4.19 (m, 1H), 4.20-4.26 (m, 1H), 4.33-4.42 (m, 1H), 5.55, 5.66 (s, each 1H) ppm.
$^{13}$C NMR (125 MHz, D$_5$ Pyridine): δ 23.8, 23.8, 24.9, 25.1, 25.5, 25.5, 25.6, 26.6, 26.7, 26.8, 26.9, 27.0, 27.0, 27.2, 27.3, 28.1, 28.2, 28.8, 28.8, 28.9, 34.2, 34.3 (t), 37.1, 37.2 (q), 63.9, 64.0 (t), 75.7, 77.1, 77.9, 78.5 (d), 111.6, 112.3 (d), 173.4, 173.5 (s) ppm.

(3aSR,17aSR)-2-(dimethylamino)tetradecahydro-8H-[1,3]dioxolo[4,5-e][1]oxacyclohexadecin-8-one (1:1 mixture of diastereoisomers)

$^1$H NMR (500 MHz, D$_5$ Pyridine): δ 1.15-1.95 (m, 18H), 2.29-2.40 (m, 3H), 2.42, 2.42 (s, each 3H), 3.67-3.76 (m, 2H), 4.12-4.22 (m, 1H), 4.26-4.32 (m, 1H), 5.63, 5.64 (s, each 1H) ppm.
$^{13}$C NMR (125 MHz, D$_5$ Pyridine): δ 23.8, 24.1, 25.0, 25.1, 25.8, 25.8, 26.6, 26.6, 26.9, 26.9, 26.9, 27.0, 27.3, 27.4, 27.9, 27.9, 29.6, 30.4, 31.4, 32.1, 34.1, 34.5, 34.5 (t), 37.1, 37.2 (q), 63.5, 63.6 (t), 79.5, 79.7 (d), 112.5, 112.6 (d), 173.4, 173.5 (s) ppm.

Formation of N,N, Dimethyl Orthoamides and Elimination

A solution of the diol prepared in example 2 b) (1.0 g, 3.68 mmol) in DMF dimethoxy acetal (2.0 g) was heated at 100° C. for 60 minutes then cooled. The solution was concentrated to dryness, then Ac$_2$O (2.0 g) was added and the solution heated at 150° C. for 1 hour in an Anton Parr Monowave 50 machine.

The reaction was diluted with MTBE and transferred to round bottomed flask and solvents removed in vacuo to yield the crude orthoamide, 1.2 g which was used as such in the elimination step. The crude orthoamide was dissolved in Ac$_2$O (3.0 g) and the mixture heated at 150° C. for 60 mins. The mixture was diluted with MTBE and water, then re extracted with MTBE, the combined organic phase was washed with saturated NaHCO$_3$, brine, dried over anhydrous MgSO$_4$, filtered and the solvents removed in vacuo to yield crude Habanolide, 0.93 g. Further purification by Kügelrohr distillation 150° C. at 1 mbar gave 1.9% w/w of (Z)-oxacyclohexadec-12-en-2-one, about 5.6% w/w of (E)-oxacyclohexadec-12-en-2-one, about 20% w/w of (E)-oxacyclohexadec-13-en-2-one and about 72% w/w of (Z)-oxacyclohexadec-13-en-2-one (3.0 g, 12.6 mmol), 0.45 g. GC analysis by DB-23 showed 12 E (5.6%), 13 E (20%), 13 Z (72%), 12 Z (1.9%).

Example 7

Preparation of a Perfuming Composition

A perfuming composition for fine fragrance was prepared by admixing the following ingredients:

| Ingredient name | Parts by weight |
| --- | --- |
| 10% * Absinthe | 80 |
| (E)-2-methoxy-4-(1-propenyl)phenyl acetate | 80 |
| (+−)-1,5-dimethyl-1-vinyl-4-hexenyl acetate | 200 |
| 1% * (+−)-2-methylundecanal | 40 |
| 10% * (−)-(3aR,5aS,9aS,9bR)-3a,6,6,9a-tetramethyldodecahydronaphtho[2,1-b]furan | 60 |
| 1,2,3,5,6,7-hexahydro-1,1,2,3,3-pentamethyl-4-indenone | 100 |
| Cedarwood oil s | 140 |
| Lemon oil | 600 |
| (+−)-3,7-dimethyl-6-octen-1-ol | 20 |
| Coriander oil | 40 |
| Coumarin | 100 |
| 10% * (+−)-(2E)-1-(2,6,6-trimethyl-2-cyclohexen-1-yl)-2-buten-1-one | 40 |
| (−)-(2E)-2-ethyl-4-[(1R)-2,2,3-trimethyl-3-cyclopenten-1-yl]-2-buten-1-ol | 80 |
| (+−)-2,6-dimethyl-7-octen-2-ol | 200 |
| Elemi | 100 |
| Elemi resin | 800 |
| 2-methoxy-4-(2-propen-1-yl)phenol | 20 |
| Gaiac | 160 |
| (E)-3,7-dimethyl-2,6-octadien-1-ol | 10 |
| Gurjun balsam | 400 |
| Methyl 2-((1RS,2RS)-3-oxo-2-pentylcyclopentyl)acetate | 2200 |
| 1-(octahydro-2,3,8,8-tetramethyl-2-naphtalenyl)-1-ethanone | 2000 |
| (+−)-3,7-dimethyl-1,6-octadien-3-ol | 200 |
| Nutmeg absolute pure and nat | 20 |
| Patchouli oil | 100 |
| Pimenta berry oil | 10 |
| Black pepper steam dist. | 60 |
| 5-(2,2,3-Trimethyl-3-cyclopentenyl)-3-methylpentan-2-ol | 10 |
| Sage oil | 20 |
| (+−)-alpha-terpineol | 10 |
| 4-hydroxy-3-methoxybenzaldehyde | 60 |
| 10% * 2,4-Dimethyl-3-cyclohexene-1-carbaldehyde) | 40 |
| | 8000 |

The addition of 2000 parts by weight of the composition of matter described in Example 1 to the above-described fine fragrance composition imparted to the latter a musky character in the direction of nitro musk with a strong powdery character as well as and creamy and oriental note. The invention's composition of matter blends particularly well with powdery elements such as Coumarin, oriental notes such as vanillin and woody-sandalwood.

The addition of the same amount of Habanolide® also imparted a musky character but in the direction of macrocyclic musk but with woody aspect. The composition obtained by said addition is devoid of powdery, creamy and oriental character. Habanolide® blends particularly well with woody-cedar elements such as Cedar wood oil and 1-(octahydro-2,3,8,8-tetramethyl-2-naphtalenyl)-1-ethanone.

The addition of the invention's composition of matter to the above-described fine fragrance composition provides more volume to the composition. Said effect is also obtained with Habanolide® but at a lower extent.

Example 8

Preparation of a Eau De Toilette Comprising the Invention's Composition of Matter The eau de toilette was prepared by adding 12% by weight, relative to the total weight of the eau de toilette, of the invention's composition of example 6 into ethanol.

Example 9

Preparation of a Liquid Detergent Comprising the Invention's Compound

TABLE 1

Composition of the liquid detergent formulation

| Ingredients | Concentration [wt %] |
|---|---|
| Sodium C14-17 Alkyl Sec Sulfonate[1] | 7 |
| Fatty acids, C12-18 and C18-unsaturated[2] | 7.5 |
| C12/14 fatty alcohol polyglycol ether with 7 mol EO[3] | 17 |
| Triethanolamine | 7.5 |
| Propylene Glycol | 11 |
| Citric acid | 6.5 |
| Potassium Hydroxyde | 9.5 |
| Properase L[4] | 0.2 |
| Puradax EG L[4] | 0.2 |
| Purastar ST L[4] | 0.2 |
| Acrylates/Steareth-20 Methacrylate structuring Crosspolymer[5] | 6 |
| Deionized Water | 27.4 |

[1] Hostapur SAS 60; Origin: Clariant
[2] Edenor K 12-18; Origin: Cognis
[3] Genapol LA 070; Origin: Clariant
[4] Origin: Genencor International
[5] Aculyn 88; Origin: Dow Chemical The liquid detergent is prepared by adding 0.5 to 1.5% by weight, relative to the total weight of the liquid detergent, of the invention's composition of example 7 into the unperfumed liquid detergent formulation of Table 1 under gentle shaking.

Example 10

Preparation of a Fabric Softener Comprising the Invention's Compound

TABLE 2

Composition of the softener formulation

| Ingredient | Concentration [wt %] |
|---|---|
| Methyl bis[ethyl (tallowate)]-2-hydroxyethyl ammonium methyl sulfate[1] | 12.20 |
| 1,2-benzisothiazolin-3-one[2] | 0.04 |
| CaCl$_2$ (10% aqueous solution) | 0.40 |
| Water | 87.36 |

[1] Stepantex VL90 A Diester Quat; Origin: Stepan
[2] Proxel GXL; Origin: Arch

The softener is prepared by weighting Methyl bis[ethyl (tallowate)]-2-hydroxyethyl ammonium methyl sulfate which was heated at 65° C. Then Water and 1,2-benzisothiazolin-3-one are placed in the reactor and are heated at 65° C. under stirring. To the above mixture is added Methyl bis[ethyl (tallowate)]-2-hydroxyethyl ammonium methyl sulfate. The mixture is stirred 15 minutes and CaCl$_2$) is added. Then 0.5 to 2% by weight, relative to the total weight of the softener, of the invention's composition of example 7 is added. The mixture is stirred 15 minutes and is cooled down to room temperature under stirring (viscosity measure: result 35+/−5 mPas. (shear rate 106 sec-1)).

Example 11

Preparation of a Transparent Isotropic Shampoo Comprising the Invention's Composition

TABLE 3

Composition of the transparent isotropic shampoo formulation

| Phases | Ingredients | Concentration [wt %] |
|---|---|---|
| A | Water deionized | 44.4 |
| | Polyquaternium-10 [1] | 0.3 |
| | Glycerin 85% [2] | 1 |
| | DMDM Hydantoin [3] | 0.2 |
| B | Sodium Laureth Sulfate [4] | 28 |
| | Cocamidopropyl Betaine [5] | 3.2 |
| | Disodium Cocoamphodiacetate [6] | 4 |
| | Ethoxy (20) Stearyl Alcohol [6] | 1 |
| C | Sodium Laureth Sulfate [4] | 3 |
| | Glyceryl Laureate [7] | 0.2 |
| D | Water deionized | 1 |
| | Sodium Methylparaben [8] | 0.1 |
| E | Sodium Chloride 10% aqueous sol. | 15 |
| | Citric acid 10% aqueous sol. till pH 5.5-6 | q.s. |

[1] Ucare Polymer JR-400, Origin: Noveon
[2] Origin: Schweizerhall
[3] Glydant, Origin: Lonza
[4] Texapon NSO IS, Origin: Cognis
[5] Tego Betain F 50, Origin: Evonik
[6] Amphotensid GB 2009, Origin: Zschimmer & Schwarz
[7] Monomuls 90 L-12, Origin: Gruenau
[8] Nipagin Monosodium, Origin: NIPA The shampoo is prepared by dispersed in water Polyquaternium-10. The remaining ingredients of phase A are mixed separately by addition of one after the other while mixing well after each adjunction. This pre-mix is added to the Polyquaternium-10 dispersion and mixed for another 5 min. Then, the premixed phase B and the premixed Phase C are added (Monomuls 90L-12 is heated to melt in Texapon NSO IS) while agitating. Phase D and Phase E are added while agitating. PH is adjusted with citric acid solution till pH: 5.5-6.0 leading to an unperfumed shampoo formulae.

The perfumed shampoo is prepared by adding 0.4 to 0.8% by weight, relative to the total weight of the shampoo, of the invention's composition of example 7 into the unperfumed shampoo formulation of Table 3 under gentle shaking.

Example 12

Preparation of a Structured Shower Gel Comprising the Invention's Composition

TABLE 4

Composition of the shower gel formulation

| Ingredients | Amount (% wt) |
| --- | --- |
| WATER deionised | 49.350 |
| Tetrasodium EDTA [1] | 0.050 |
| Acrylates Copolymer [2] | 6.000 |
| Sodium C12-C15 Pareth Sulfate [3] | 35.000 |
| Sodium Hydroxide 20% aqueous solution | 1.000 |
| Cocamidopropyl Betaine [4] | 8.000 |
| Methylchloroisothiazolinone and Methylisothiazolinone [5] | 0.100 |
| Citric Acid (40%) | 0.500 |

[1] EDETA B POWDER; trademark and origin: BASF
[2] CARBOPOL AQUA SF-1 POLYMER; trademark and origin: NOVEON
[3] ZETESOL AO 328 U; trademark and origin: ZSCHIMMER & SCHWARZ
[4] TEGO-BETAIN F 50; trademark and origin: GOLDSCHMIDT
[5] KATHON CG; trademark and origin: ROHM & HASS The shower gel is prepared by adding 0.5 to 1.5% by weight, relative to the total weight of the shower gel, of the invention's composition of example 7 into the unperfumed shower gel formulation of Table 4 under gentle shaking.

Example 13

Preparation of a Transparent Shower Gel Comprising the Invention's Composition

TABLE 5

Composition of the transparent shower gel formulation

| Ingredients | Concentration (% wt) |
| --- | --- |
| WATER deionized | 52.40 |
| Tetrasodium EDTA [1] | 0.10 |
| Sodium Benzoate | 0.50 |
| Propylene Glycol | 2.00 |
| Sodium C12-05 Pareth Sulfate [2] | 35.00 |
| Cocamidopropyl Betaine [3] | 8.00 |
| Polyquatemium-7 [4] | 0.20 |
| Citric Acid (40%) | 1.00 |
| Sodium Chloride | 0.80 |

[1] EDETA B POWDER; trademark and origin: BASF
[2] ZETESOL AO 328 U; trademark and origin: ZSCHIMMER & SCHWARZ
[3] TEGO-BETAIN F 50; trademark and origin: GOLDSCHMIDT
[4] MERQUAT 550; trademark and origin: LUBRIZOL The transparent shower gel is prepared by adding 0.5 to 1.5% by weight, relative to the total weight of the shower gel, of the invention's composition of example 7 into the unperfumed shower gel formulation of Table 5 under gentle shaking.

Example 14

Preparation of a Milky Shower Gel Comprising the Invention's Composition

TABLE 6

Composition of the milky shower gel formulation

| Ingredients | Concentration (% wt) |
| --- | --- |
| WATER deionized | 50.950 |
| Tetrasodium EDTA [1] | 0.050 |
| Sodium Benzoate | 0.500 |
| Glycerin 86% | 3.500 |
| Sodium Laureth Sulfate [2] | 27.000 |
| Polyquatemium-7 [3] | 1.000 |
| Coco-Betaine [4] | 6.000 |
| PEG-120 Methyl Glucose trioleate [5] | 1.000 |
| Citric Acid (40%) | 1.000 |
| Glycol Distearate & Laureth-4 & Cocamidopropyl Betaine [6] | 3.000 |
| Sodium Chloride 20% | 5.000 |
| PEG-40 Hydrogenated Castor Oil [7] | 1.000 |

[1] EDETA B POWDER; trademark and origin: BASF
[2] Texapon NSO IS; trademark and origin: COGNIS
[3] MERQUAT 550; trademark and origin: LUBRIZOL
[4] DEHYTON AB-30; trademark and origin: COGNIS
[5] GLUCAMATE LT; trademark and origin: LUBRIZOL
[6] EUPERLAN PK 3000 AM; trademark and origin: COGNIS
[7] CREMOPHOR RH 40; trademark and origin: BASF The transparent shower gel is prepared by adding 0.5 to 1.5% by weight, relative to the total weight of the shower gel, of the invention's composition of example 7 into the unperfumed shower gel formulation of Table 6 under gentle shaking.

Example 15

Preparation of a Pearly Shampoo Comprising the Invention's Composition

TABLE 7

Composition of the pearly isotropic shampoo formulation

| Phases | Ingredients | Concentration (% wt) |
| --- | --- | --- |
| A | Water deionized | 45.97 |
|   | Tetrasodium EDTA [1] | 0.05 |
|   | Guar Hydroxypropyltrimonium Chloride [2] | 0.05 |
|   | Polyquatemium-10 [3] | 0.075 |
| B | NaOH 10% aqueous sol. | 0.3 |
| C | Ammonium Lauryl Sulfate [4] | 34 |
|   | Ammonium Laureth Sulfate [5] | 9.25 |
|   | Cocamidopropyl Betaine [6] | 2 |
|   | Dimethicone (&) C12-13 Pareth-4 (&) C12-13Pareth-23 (&) Salicylic Acid [7] | 2.5 |
| D | Cetyl Alcohol [8] | 1.2 |
|   | Cocamide MEA [9] | 1.5 |
|   | Glycol Distearate [10] | 2 |

TABLE 7-continued

Composition of the pearly isotropic shampoo formulation

| Phases | Ingredients | Concentration (% wt) |
|---|---|---|
| E | Methylchloroisothiazolinone & Methylisothiazolinone [11] | 0.1 |
| | D-Panthenol 75% [12] | 0.1 |
| | Water deionized | 0.3 |
| F | Sodium Chloride 25% aqueous sol. | 0.6 |

[1] EDETA B Powder, Origin: BASF
[2] Jaguar C14 S, Origin: Rhodia
[3] Ucare Polymer JR-400, Origin: Noveon
[4] Sulfetal LA B-E, Origin: Zschimmer & Schwarz
[5] Zetesol LA, Origin: Zschimmer & Schwarz
[6] Tego Betain F 50, Origin: Evonik
[7] Xiameter MEM-1691, Origin: Dow Corning
[8] Lanette 16, Origin: BASF
[9] Comperlan 100, Origin: Cognis
[10] Cutina AGS, Origin: Cognis
[11] Kathon CG, Origin: Rohm & Haas
[12] D-Panthenol, Origin: Roche The shampoo is prepared by dispersed in water and Tetrasodium EDTA, Guar Hydroxypropyltrimonium Chloride and Polyquaternium-10. NaOH 10% solution (Phase B) is added once Phase A is homogeneous. Then, the premixed Phase C is added. and mixture is heated to 75° C. Phase D ingredients are added and mixed till homogeneous. The mixture is cooled down. At 45° C., Phase E ingredients are added while mixing. Final viscosity is adjusted with 25% NaCl solution and pH of 5.5-6 is adjusted with 10% NaOH solution.

The perfumed pearly shampoo is prepared by adding 0.4 to 0.8% by weight, relative to the total weight of the shampoo, of the invention's composition of example 7 into the unperfumed shampoo formulation of Table 7 under gentle shaking.

Example 16

Preparation of a Structured Shower Gel Comprising the Invention's Composition

TABLE 8

Composition of the milky shower gel formulation

| Ingredients | Amount (% wt) |
|---|---|
| WATER deionised | 49.350 |
| Tetrasodium EDTA [1] | 0.050 |
| Acrylates Copolymer[2] | 6.000 |
| Sodium C12-C15 Pareth Sulfate [3] | 35.000 |
| Sodium Hydroxide 20% aqueous solution | 1.000 |
| Cocamidopropyl Betaine[4] | 8.000 |
| Methylchloroisothiazolinone and Methylisothiazolinone[5] | 0.100 |
| Citric Acid (40%) | 0.500 |

6) EDETA B POWDER; trademark and origin: BASF
7) CARBOPOL AQUA SF-1 POLYMER; trademark and origin: NOVEON
8) ZETESOL AO 328 U; trademark and origin: ZSCHIMMER & SCHWARZ
9) TEGO-BETAIN F 50; trademark and origin: GOLDSCHMIDT
10) KATHON CG; tradeark and origin: ROHM & HASS The transparent shower gel is prepared by adding 0.5 to 1.5% by weight, relative to the total weight of the shower gel, of the invention's composition of example 7 into the unperfumed shower gel formulation of Table 8 under gentle shaking.

Example 17

Preparation of Anhydrous Antiperspirant Spray Formulations Comprising the Invention's Composition

TABLE 9

Composition of the anhydrous antiperspirant spray formulation

| Ingredients | Amount (% wt) |
|---|---|
| Cyclomethicone [1] | 53.0 |
| Isopropyl myristate | 9.0 |
| Silica [2] | 1.0 |
| Quaternium-18-hectorite [3] | 3.3 |
| Aluminium chlorohydrate [4] | 32.7 |
| Perfume oil | 1 |

[1] Dow Corning ® 345 Fluid; origin: Dow Corning
[2] Aerosil ® 200; origin: Evonik
[3] Bentone ® 38; origin: Elementis Specialities
[4] Micro Dry Ultrafine; origin: Reheis Anhydrous antiperspirant spray formulation is prepared by using a high speed stirrer. Silica and Quaternium-18-hectorite are added to the mixture of isopropyl myristate and cyclomethicone. Once completely swollen, aluminium chlorohydrate is added portion-wise under stirring until the mixture becomes homogeneous and without lumps. Then a perfume oil being the invention's composition of example 7 is added.

Example 18

Preparation of Deodorant Spray Emulsion Formulations Comprising the Invention's Composition

TABLE 10

Composition of deodorant spray emulsion formulation

| Ingredients | Amount (% wt) |
|---|---|
| Ethanol (95%) | 89.25 |
| Triclosan [1] | 0.25 |
| Isopropyl myristate | 9.00 |
| Invention's composition of Example 7 | 1.5 |

[1] Irgasan ® DP 300; origin: BASF
[2] mixture of Compounds 2a/2b ca. 45:55

Deodorant spray emulsion formulation is prepared by mixing and dissolving all the ingredients according to the sequence of Table 10. Aerosol cans are filled, and the propellant is crimped and added. Aerosol filling: 40% active solution 60% propane/butane (2.5 bar).

Example 19

Preparation of Deodorant Stick Formulations Comprising the Invention's Composition

TABLE 11

Composition of Deodorant stick formulation

| Phase | Ingredients | Amount (% wt) |
|---|---|---|
| A | Stearic acid | 5.00 |
| | 1,2-Propylene glycol | 41.45 |
| | Sodium hydroxide (20% aqueous solution) | 4.20 |
| | Water | 30.00 |

TABLE 11-continued

Composition of Deodorant stick formulation

| Phase | Ingredients | Amount (% wt) |
|---|---|---|
| | Tetrasodium EDTA [1] | 0.10 |
| | Ceteareth-25 [2] | 1.50 |
| | PPG-3 Myristyl ether [3] | 1.50 |
| B | 1,2-Propylene glycol | 15.00 |
| | Triclosan [4] | 0.25 |
| C | Perfume oil | 1 |

[1] Edeta ® B Power; origin: BASF
[2] Cremophor ® A25; origin: BASF
[3] Tegosoft ® APM; origin: Evonik
[4] Irgasan ® DP 300; origin: BASF Deodorant stick formulation is obtained by weighing all the components of Part A and heating to 70-75° C. Ceteareth-25 is added once the other Part A ingredients are mixed and heated. When the Ceteareth-25 is dissolved, stearic acid is added. Part B is prepared by dissolving Triclosan in 1,2-propylene glycol. Evaporated water is compensated. Then, slowly, under mixing, Part B is poured into Part A. A perfume oil being the invention's composition of example 7 (Phase C) is added under gentle shaking. To stock, a plastic bag is put into the bucket to be sealed after cooling. Moulds were filled at about 70° C.

Example 20

Preparation of Deodorant Roll-on Formulations Comprising the Invention's Composition

TABLE 12

Composition of deodorant roll-on formulation

| Phase | Ingredients | Amount (% wt) |
|---|---|---|
| A | Water | 50.00 |
| | Hydroxyethylcellulose [1] | 0.70 |
| B | Ethanol (95%) | 40.00 |
| | 1,2-Propylene glycol | 5.00 |
| | Triclosan [2] | 0.30 |
| C | PEG-40 hydrogenated castor oil [3] | 3.00 |
| D | Invention's composition of Example 7 | 1 |

[1] Natrosol ® 250 H; origin: Ashland
[2] Irgasan ® DP 300; origin: BASF
[3] Cremophor ® RH 40; origin: BASF Part A is prepared by sprinkling little-by-little the hydroxyethylcellulose into the water, whilst rapidly stirring with a turbine until the hydroxyethylcellulose is entirely swollen giving a limpid gel. Part B is slowly poured into Part A, whilst continuing stirring until the entire mixture is homogeneous. Then Parts C and D are added under gentle shaking.

Example 21

Preparation of Day Cream Base O/W Emulsions Comprising the Invention's Composition

TABLE 13

Composition of day cream base O/W emulsion formulation

| Phase | Ingredients | Amount (% wt) |
|---|---|---|
| A | Steareth-2 (and) PEG-8 Distearate [1] | 5.0 |
| | Cetyl alcohol | 0.5 |
| | Ceteth-20 (AND) glyceryl stearate (and) PEG-6 stearate (and) Steareth-20 [2] | 4.0 |
| | Squalan [3] | 1.0 |
| | Paraffin oil [4] | 2.0 |
| | Petrolatum [5] | 5.5 |
| B | Deionized water | 75.9 |
| | Propylene glycol | 5.0 |
| C | Phenoxyethanol (AND) Piroctone olamine [6] | 0.6 |
| D | Sodium carbomer [7] | 0.2 |
| E | Perfume oil | 0.3 |

[1] Arlacel ® 985; origin: Croda
[2] Tefose ® 2561; origin: Gattefossé
[3] Biolip P 90; origin: Gattefossé
[4] Mineral oil 30-40 CPS
[5] petroleum jelly
[6] Nipaguard ® PO 5; origin: Clariant
[7] PNC 400

Day cream base O/W emulsions is prepared by heating Phases A and B separately to 70-75° C. Phase A is added to Phase B, then vacuum is applied. The mixture is stirred and cooled to 55° C. for 15 min. After cooling to room temperature, phenoxyethanol (and) piroctone olamine (Part C) are added when a temperature of 45° C. is reached. The mixture is stirred for 5 min before sodium carbomer (Part D) and a perfume oil being the invention's composition of Example 7 (Part E) is added. The mixture is stirred for 3 min, then the stirring was stopped for 15 min. When the temperature of the mixture reaches 30° C., the stirring is resumed for another 15 min until the cream becomes homogeneous, glossy and without lumps. If necessary the pH is adjusted to 6.70-7.20 with Glydant, Phenonip or Nipaguard P05 or to 6.30-7.00 with Nikkoguard.

The invention claimed is:

1. A composition of matter comprising:
   a) 0.5 to 85% w/w of (Z)-oxacyclohexadec-12-en-2-one;
   b) 0.5 to 30% w/w of (E)-oxacyclohexadec-12-en-2-one;
   c) 0 to 30% w/w of (E)-oxacyclohexadec-13-en-2-one; and
   d) 0.5 to 85% w/w of (Z)-oxacyclohexadec-13-en-2-one, the percentage being relative to the total weight of the composition of matter;
   wherein the weight ratio of the E-diastereoisomers to the Z-diastereoisomers is comprised in the range between 40:60 and 15:85.

2. The composition of matter according to claim 1, wherein said composition comprises:
   a) 7 to 85% w/w of (Z)-oxacyclohexadec-12-en-2-one;
   b) 0.5 to 25% w/w of (E)-oxacyclohexadec-12-en-2-one;
   c) 0 to 30% w/w of (E)-oxacyclohexadec-13-en-2-one; and
   d) 0.5 to 85% w/w of (Z)-oxacyclohexadec-13-en-2-one.

3. The composition of matter according to claim 1, wherein said composition comprises:
   a) 40 to 85% w/w of (Z)-oxacyclohexadec-12-en-2-one;
   b) 2 to 25% w/w of (E)-oxacyclohexadec-12-en-2-one;

c) 0 to 20% w/w of (E)-oxacyclohexadec-13-en-2-one; and
d) 0.5 to 35% w/w of (Z)-oxacyclohexadec-13-en-2-one.

4. The composition of matter according to claim 1, wherein said composition comprises:
   a) 50 to 85% w/w of (Z)-oxacyclohexadec-12-en-2-one;
   b) 5 to 20% w/w of (E)-oxacyclohexadec-12-en-2-one;
   c) 0 to 20% w/w of (E)-oxacyclohexadec-13-en-2-one; and
   d) 0.5 to 25% w/w of (Z)-oxacyclohexadec-13-en-2-one.

5. The composition of matter according to claim 1, wherein the weight ratio of the E-diastereoisomers to the Z-diastereoisomers is comprised in the range between 30:70 and 17:83.

6. A method to confer, enhance, improve or modify the odor properties of a perfuming composition or of a perfumed article, which method comprises adding to said composition or consumer product an effective amount of the composition of matter according to claim 1.

7. A perfuming composition comprising
   i) at least a composition of matter according to claim 1;
   ii) at least one ingredient selected from the group consisting of a perfumery carrier and a perfumery base; and
   iii) optionally at least one perfumery adjuvant.

8. A perfumed consumer product comprising the perfuming composition according to claim 7.

9. The perfumed consumer product according to claim 8, wherein the perfumed consumer product is a perfume, a fabric care product, a body-care product, a cosmetic preparation, a skin-care product, an air care product, or a home care product.

10. The perfumed consumer product according to claim 9, wherein the perfumed consumer product is a fine perfume, a splash or eau de parfum, a cologne, a shave or after-shave lotion, a liquid or solid detergent, a fabric softener, a fabric refresher, an ironing water, a paper, a bleach, a carpet cleaner, a curtain-care product, a shampoo, a coloring preparation, a color care product, a hair shaping product, a dental care product, a disinfectant, an intimate care product, a hair spray, a vanishing cream, a deodorant or antiperspirant, a hair remover, a tanning or sun product, a nail product, a skin cleansing, a makeup, a perfumed soap, a shower or bath mousse, oil or gel, a foot/hand care product, a hygiene product, an air freshener, a "ready to use" powdered air freshener, a mold remover, a furnisher care product, a wipe, a dish detergent or hard-surface detergent, a leather care product, or a car care product.

11. A process to prepare the composition of matter according to claim 1, wherein the process comprises a thermal elimination of a mixture comprising
   i) 0.5 to 85% w/w of compound of formula

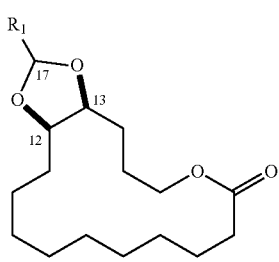

(I)

in the form of any one of its stereoisomers or a mixture thereof, wherein $R^1$ represents a $OR^2$ or a $NR^2_2$ group, and wherein $R^2$ represents a $C_{1-3}$ alkyl group;

ii) 0.5 to 85% w/w of compound of formula

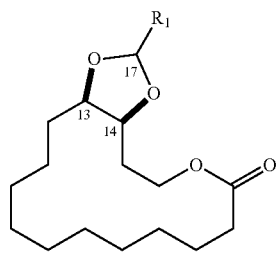

(II)

in the form of any one of its stereoisomers or a mixture thereof, wherein $R^1$ has the same meaning as defined above;

iii) 0.5 to 30% w/w of compound of formula

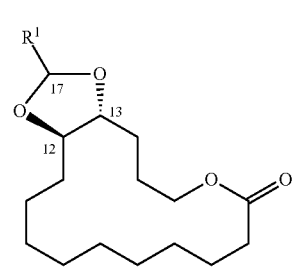

(III)

in the form of any one of its stereoisomers or a mixture thereof, wherein $R^1$ has the same meaning as defined above; and iv) 0 to 30% w/w of compound of formula

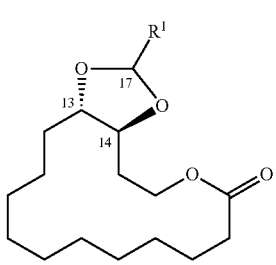

(IV)

in the form of any one of its stereoisomers or a mixture thereof, wherein $R^1$ has the same meaning as defined above.

12. The process according to claim 11, wherein the preparation of the mixture comprising from 0.5 to 85% of compound of formula (I), from 0.5 to 85% of compound of formula (II), from 0.5 to 30% of compound of formula (III) and from 0 to 30% of compound of formula (IV) comprises:
   a) an epoxidation of a composition comprising at least 70% of oxacyclohexadec-12-en-2-one and oxacyclohexadec-13-en-2-one with the double bond with E configuration and at most 30% of oxacyclohexadec-12-en-2-one and oxacyclohexadec-13-en-2-one with the double bond with Z configuration;

b) a hydrolysis of the mixture obtained in step a) to form a mixture of diols comprising
  i) 0.5 to 85% w/w of diol (12RS,13SR)-12, 13-dihydroxyoxacyclohexadecan-2-one;
  ii) 0.5 to 85% w/w of diol (13RS,14SR)-13, 14-dihydroxyoxacyclohexadecan-2-one;
  iii) 0.5 to 30% w/w of diol (12RS,13RS)-12,13-dihydroxyoxacyclohexadecan-2-one; and
  iv) 0 to 30% w/w of diol (13SR,14SR)-13,14-dihydroxyoxacyclohexadecan-2-one; and
c) treating the diols obtained in step b) with a tri $C_{1-3}$ alkyl orthoformate or DMF acetal.

13. The composition of matter according to claim 1, wherein the weight ratio of the E-diastereoisomers to the Z-diastereoisomers is comprised in the range between 25:75 and 18:82.

14. A perfumed consumer product comprising at least a composition of matter according to claim 1.

15. The perfumed consumer product according to claim 14, wherein the perfumed consumer product is a perfume, a fabric care product, a body-care product, a cosmetic preparation, a skin-care product, an air care product, or a home care product.

16. The perfumed consumer product according to claim 15, wherein the perfumed consumer product is a fine perfume, a splash or eau de parfum, a cologne, a shave or after-shave lotion, a liquid or solid detergent, a fabric softener, a fabric refresher, an ironing water, a paper, a bleach, a carpet cleaner, a curtain-care product, a shampoo, a coloring preparation, a color care product, a hair shaping product, a dental care product, a disinfectant, an intimate care product, a hair spray, a vanishing cream, a deodorant or antiperspirant, a hair remover, a tanning or sun product, a nail product, a skin cleansing, a makeup, a perfumed soap, a shower or bath mousse, oil or gel, a foot/hand care product, a hygiene product, an air freshener, a "ready to use" powdered air freshener, a mold remover, a furnisher care product, a wipe, a dish detergent or hard-surface detergent, a leather care product, or a car care product.

* * * * *